US012306970B2

(12) United States Patent
Majko-Ruben

(10) Patent No.: US 12,306,970 B2
(45) Date of Patent: May 20, 2025

(54) AUTHENTICATING DATA FOR STORAGE USING A DATA STORAGE SYSTEM AND DISTRIBUTED ELECTRONIC LEDGER SYSTEM

(71) Applicant: GREEN DATA TECHNOLOGY INC., Seattle, WA (US)

(72) Inventor: Stephen Majko-Ruben, Bellingham, WA (US)

(73) Assignee: GREEN DATA TECHNOLOGY INC., Seattle, WA (US)

( * ) Notice: Subject to any disclaimer, the term of this patent is extended or adjusted under 35 U.S.C. 154(b) by 216 days.

(21) Appl. No.: 17/105,074

(22) Filed: Nov. 25, 2020

(65) Prior Publication Data

US 2021/0157954 A1 May 27, 2021

Related U.S. Application Data

(60) Provisional application No. 62/941,543, filed on Nov. 27, 2019.

(51) Int. Cl.
*G06F 21/57* (2013.01)
*G06F 16/18* (2019.01)
(Continued)

(52) U.S. Cl.
CPC ........ *G06F 21/6209* (2013.01); *G06F 16/182* (2019.01); *G06F 16/1873* (2019.01);
(Continued)

(58) Field of Classification Search
CPC ............... G06F 21/6209; G06F 16/182; G06F 16/1873; G06F 16/219; G06F 21/45;
(Continued)

(56) References Cited

U.S. PATENT DOCUMENTS 8,650,156 B1    2/2014  McHugh et al.
9,201,897 B1   12/2015  Zeliger et al.
(Continued)

FOREIGN PATENT DOCUMENTS

CN          105512129 A       4/2016

OTHER PUBLICATIONS

U.S. Appl. No. 17/105,106**, filed Nov. 25, 2020, Pal et al.
(Continued)

*Primary Examiner* — Sarah Su
*Assistant Examiner* — Vladimir I Gavrilenko
(74) *Attorney, Agent, or Firm* — Knobbe, Martens, Olson & Bear, LLP

(57) ABSTRACT

A data file management system can manage and/or authenticate data files for users. The data file management system may include a storage system for retaining a library of data file versions and an authentication system that authenticates data files for storage. The data file management system can receive a request to store a first version of a data file, generate a first content identifier for the first version of the data file, identify another version of the data file as a second version of the data file, obtain a second content identifier for the second version of the data file; compare the first content identifier with the second content identifier; based at least in part on a determination that the first content identifier does not match the second content identifier, communicate the first content identifier to a distributed electronic ledger system for storage as at least a portion of a block in the distributed electronic ledger system; and store the first version of the data file in the storage system.

20 Claims, 6 Drawing Sheets

(51) Int. Cl.
  *G06F 16/182* (2019.01)
  *G06F 16/21* (2019.01)
  *G06F 21/45* (2013.01)
  *G06F 21/62* (2013.01)
  *G06F 21/64* (2013.01)
  *H04L 9/32* (2006.01)
  *H04L 9/00* (2022.01)

(52) U.S. Cl.
  CPC ............ *G06F 16/219* (2019.01); *G06F 21/45* (2013.01); *G06F 21/57* (2013.01); *G06F 21/64* (2013.01); *H04L 9/3239* (2013.01); *H04L 9/50* (2022.05)

(58) Field of Classification Search
  CPC ....... G06F 21/57; G06F 21/64; H04L 9/3239; H04L 9/50
  See application file for complete search history.

(56) References Cited

U.S. PATENT DOCUMENTS

| | | | | |
|---|---|---|---|---|
| 11,062,042 | B1* | 7/2021 | McKervey | G06F 16/137 |
| 11,314,692 | B1* | 4/2022 | Gutierrez | G06F 16/1734 |
| 2008/0195868 | A1 | 8/2008 | Asokan et al. | |
| 2011/0295936 | A1 | 12/2011 | Gill et al. | |
| 2013/0275590 | A1 | 10/2013 | Wong | |
| 2016/0364432 | A1* | 12/2016 | Dzikowska | G06F 16/2386 |
| 2017/0220814 | A1* | 8/2017 | Pathak | G06F 21/105 |
| 2018/0025181 | A1 | 1/2018 | Barinov et al. | |
| 2018/0232394 | A1* | 8/2018 | Danziger | G06F 16/172 |
| 2019/0065709 | A1 | 2/2019 | Salomon | |
| 2019/0132138 | A1 | 5/2019 | Finlow-Bates et al. | |
| 2019/0182033 | A1 | 6/2019 | Li et al. | |
| 2019/0278944 | A1 | 9/2019 | Cheng et al. | |
| 2020/0159696 | A1 | 5/2020 | Adluri et al. | |
| 2021/0067344 | A1* | 3/2021 | Drake | H04L 63/126 |

OTHER PUBLICATIONS

Renner T, Muller J, Kao O. "Endolith: A blockchain-based framework to enhance data retention in cloud storages." In 2018 26th Euromicro International Conference on Parallel, Distributed and Network-Based Processing (PDP) Mar. 21, 2018 (pp. 627-634). IEEE. (Year: 2018).

* cited by examiner

AUTHENTICATING DATA FOR STORAGE USING A DATA STORAGE SYSTEM AND DISTRIBUTED ELECTRONIC LEDGER SYSTEM

FIELD

The present disclosure relates to maintaining data integrity.

BACKGROUND

Data integrity refers to the accuracy, consistency, and/or reliability of data over its lifecycle. One of the most basic data integrity threats is human error, such as entering information incorrectly, duplicating data, or unintentionally deleting data. Cybercrime at the hands of malicious actors may also occur. Maintaining data integrity can be a vital part of data management.

BRIEF DESCRIPTION OF THE DRAWINGS

Various embodiments will be described hereinafter with reference to the accompanying drawings. These embodiments are illustrated and described by example only, and are not intended to limit the scope of the disclosure. In the drawings, similar elements have similar reference numerals.

DETAILED DESCRIPTION

Data integrity may be compromised in a variety of ways including, but not limited to, human error (whether malicious or unintentional), transfer errors (including unintended alterations or data compromise during transfer from one device to another), bugs, viruses/malware, hacking, and other cyber threats, compromised hardware (such as a device or disk crash), physical compromise to devices, or the like. These compromises can become more likely as the data passes through or is modified by multiple sources. For example, in a *cannabis* supply chain all *cannabis*-touching businesses—from growers to retailers—may be permitted to input or edit data, which can increase the likelihood of data integrity compromises.

To address these or other challenges, a data file management system can be implemented to manage and authenticate data files for users. The data file management system may include a storage system for retaining a library of data file versions and an authentication system that authenticates data files for use and/or for storage. By retaining a library of data file versions, prior versions may be recalled or reviewed, should there be a discrepancy or issue in one or more of the later versions. Furthermore, a distributed electronic ledger system can linearly link the data file versions, which can provide transparency, security, and traceability.

System Overview

Figure 1:
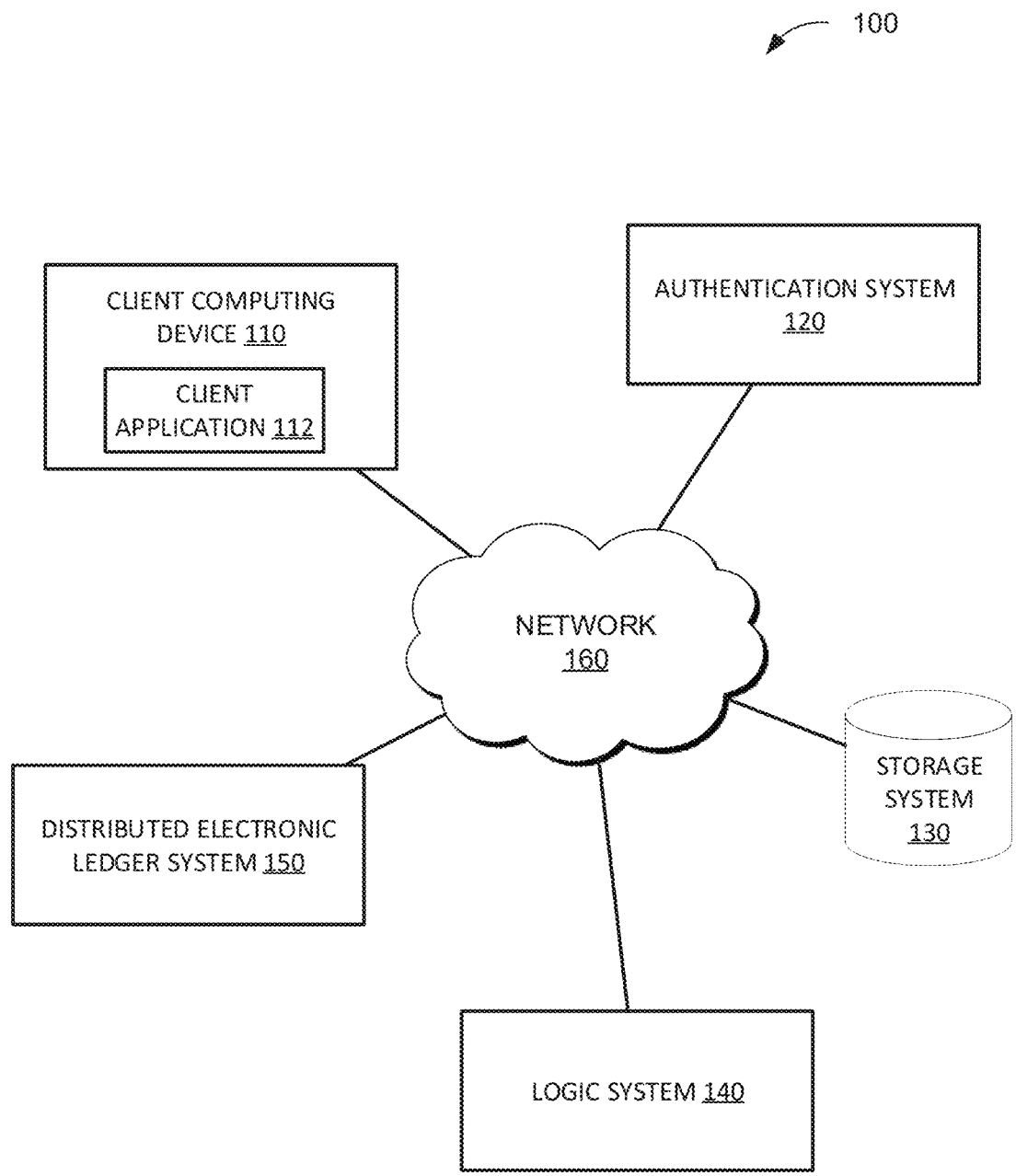
FIG. 1 is a block diagram illustrating an embodiment of a computing environment that includes a distributed electronic ledger system.

FIG. 1 illustrates an embodiment of an environment 100 for maintaining data integrity. The environment 100 includes a network 160, a client computing device 110, an authentication system 120, a storage system 130, a logic system 140, and a distributed electronic ledger system 150. To simplify discussion and not to limit the present disclosure, FIG. 1 illustrates only one client computing device 110, authentication system 120, storage system 130, logic system 140, and distributed electronic ledger system 150, though multiple devices or systems may be used. In some cases, two or more of the authentication system 120, storage system 130, or logic system 140 can form a data file management system.

Any of the foregoing devices or systems of the environment 100 may communicate via a network 160. Although only one network 160 is illustrated, multiple distinct and/or distributed networks 160 may exist. The network 160 can include any type of communication network. For example, the network 160 can include one or more of a wide area network (WAN), a local area network (LAN), a cellular network, an ad hoc network, a satellite network, a wired network, a wireless network, and so forth. In some embodiments, the network 160 can include the Internet.

Any of the foregoing devices or systems of the environment 100, such as any one or any combination of the client computing device 110, the authentication system 120, the storage system 130, the logic system 140, or the distributed electronic ledger system 150, may be implemented using individual computing devices, distributed processing systems, servers, isolated execution environments (e.g., virtual machines, etc.), shared computing resources, or so on.

The client computing device 110 can be controlled by a user. The client computing device 110 may include hardware and software components for establishing communications over the network 160. For example, the client computing device 110 may be equipped with networking equipment and network software applications (for example, a web browser) that facilitate communications via the network 160. The client computing device 110 may have varied local computing resources such as central processing units and architectures, memory, mass storage, graphics processing units, communication network availability and bandwidth, and so forth. Further, the client computing device 110 may include any type of computing system. For example, the client computing device 110 may include any type of computing device(s), such as desktops, laptops, and wireless mobile devices (for example, smart phones, PDAs, tablets, or the like), to name a few.

In some embodiments, a client computing device 110 may host or execute one or more client applications 112 that are capable of interacting with the authentication system 120, storage system 130, logic system 140, or distributed electronic ledger system 150 via the one or more networks 160. For instance, a client application 112 may be or comprise a web browser that a user may use to navigate to one or more websites or other resources provided by authentication system 120. As another example, a client application 112 may comprise a mobile application or "app." For example, an operator of a network-based service hosted by one or more host devices may make available one or more mobile apps that enable users of client computing devices 110 to access various resources of the network-based service. As yet another example, client applications 112 may include background processes that perform various operations without direct interaction from a user. A client applications 112 may include a "plug-in" or "extension" to another application, such as a web browser plug-in or extension. The client computing device 110 can include various input devices that can be used to provide input, such as to the client application 112.

In some embodiments, the client application 112 may facilitate inventory management. For example, in some cases, the client application 112 may include or be part of an inventory tool for managing inventory, such as inventory related to *cannabis*, medical supplies, etc. In some such cases, the client application 112 may interact with one or more of the authentication system 120, storage system 130, logic system 140, or distributed electronic ledger system 150 to retrieve, open, modify, or save data files. As used herein, the term "data file" or similar term, is used broadly to refer to any computer file that includes any type of data. For example, a data file can include, but is not limited to, a CSV file, an XLS file, an XML file, a word processing document, a spreadsheet, a record, an inventory document, a database entry, etc.

The authentication system 120 can facilitate authentication of data files for use, storage of new data files or new versions of data files, application of rules or logic regarding data file discrepancies, or the like. For example, the authentication system 120 may communicate with a client computing device 110 and/or client application 112 to receive requests for data files, deliver data files, receive data files, provide results of authentications, etc. As another example, the authentication system 120 may communicate with (or include) the storage system 130 to store or retrieve content identifiers, data files, other information relating to data files, and/or retrieval information associated with data stored in the distributed electronic ledger system 150. As another example, the authentication system 120 may communicate with the distributed electronic ledger system 150 to send or receive block entries, content identifiers, smart contracts, retrieval information, etc. As another example, the authentication system 120 may communication with the logic system 140 to receive or communicate instructions regarding acceptable or unacceptable discrepancies between data files, etc.

As described herein, the client computing device 110 can request and/or modify data files. The authentication system 120 can generate content identifiers for each data file or each version of a data file. In certain embodiments, the authentication system 120 generates a content identifier using a hash function (non-limiting examples: SHA-256, SHA-3, custom hash function, etc.), fingerprint function, lossy compression algorithm, tokenization function, or other algorithm that can generate a unique identifier. For example, the authentication system 120 can perform a hash or fingerprint function on the content of the data file to generate the content identifier for the data file.

In certain cases, the authentication system 120 can generate multiple content identifiers for a data file. For example, the authentication system 120 can generate a content identifier for individual portions of a data file. In some cases, a data file may be editable by different entities and some entities may have authorization to modify one portion of the data file and other entities may have authorization to modify another portion of the data file.

For example, consider a scenario in which one portion of a data file is editable by entity 1 and a second portion of the data file is editable by entity 2. In some such cases, the authentication system 120 can generate a content identifier for the portions of the data file editable by entity 1 and another content identifier for the portions of the data file editable by entity 2. In this way, the authentication system 120 can manage changes to different portions of the data file.

In certain cases, the authentication system 120 can track the changes to the different portions of a data file. In some cases, a change to any portion of the data file results in a new version for the entire data file. In certain cases, the authentication system 120 can track different versions for different portions of the file and update the versions for the different portions asynchronously. For example, portion 1 of the data file (editable by entity 1) may be on version 3, while portion 2 of the data file (editable by entity 2) may be on version 9. Alternatively, the authentication system 120 may treat the data file as having 12 versions (e.g., a version for changes made by either entity 1 or entity 2). In cases, where the authentication system 120 tracks versions of portions of the data file, it may determine the version of the data file as a combination of the versions of the different portions. With continued reference to the example above, the version of the data file may be referred to as version 3.9 or 9.3 given that portion 1 of the data file is at version 3 and portion 2 is at version 9. In certain cases, rather than having different portions of a data file, the authentication system can treat them as sub-files of a data file or as related data files, and track the versions of the different sub-files or related files separately, etc.

In some embodiments, the content identifier can correspond to a hash, fingerprint, checksum, lossy compression output, token, or other identifier that is generated from the content of a data file, and in some or all cases, uniquely identifies one version of a data file from other versions of the data file and/or uniquely identifies one data file from other data files processed or stored by the authentication system 120, and/or the distributed electronic ledger system 150.

In some cases, in addition to or rather than generating the content identifiers itself, the authentication system 120 can receive a content identifier. For example, an external data system such as, but not limited to, the distributed electronic ledger system 150 that is in communication with the authentication system 120 can communicate a content identifier to the authentication system 120, such as a content identifier that is associated with data stored on the distributed electronic ledger system 150.

As described herein, the authentication system 120 can authenticate one or more versions of a data file. In some cases, a version of a data file is determined to be authenticated or valid if that version was created by starting with (and making modifications to) the correct (e.g., latest, original, etc.) previous version of the data file. For example, consider a scenario in which a data file include three versions: an original version, a modification of the original version (i.e., a second version), and a modification of the second version (i.e., a third version). In some cases, the authentication system 120 will determine that the version (e.g., the fourth version) is authenticated as long as it is a modification of the third version, rather than being a modification of the original version, the second version, or another version.

In certain embodiments, the authentication system 120 can authenticate a data file in response to a request for that data file. For example, as part of authenticating the data file, the authentication system 120 can retrieve one, some, or all versions of the data file from the storage system 130 and can generate content identifiers for the retrieved versions. Furthermore, the authentication system 120 can retrieve stored content identifiers from a distributed electronic ledger system 150 and can compare the generated content identifiers with the stored content identifiers. In some cases, if the generated content identifiers match the stored content identifiers, the authentication system 120 authenticates the data file and communicates it to the user.

In certain embodiments, the authentication system 120 can authenticate a current version of the data file in response to a request to store that data file. For example, as part of authenticating the data file, the authentication system 120 can retrieve a previous version of the data file from the storage system 130, generate a content identifier for the previous version of the data file, generate a content identifier for the current version of the data file, and compare the content identifiers for the previous and current versions. In some cases, if the previous version content identifier does not match the current version content identifiers the authentication system 120 authenticates the current version of the data file and communicates it to the distributed electronic ledger system 150 as part of a block entry. In some cases, the block entry can include additional information or fields, such as, but not limited to, version, ID, type, created date, status, location, last updated, last updated by ID, name, batch identifier, strain identifier, other attributes, Nonce, or other metadata, etc. Moreover, in some cases, the block entry can include or be a content identifier generated from a combination of the additional information and the content identifier generated for the data file. In turn, the distributed electronic ledger system 150 can store the block entry (or at least a portion of its content) as part of a distributed ledger or blockchain.

The authentication system 120 can communicate block entries in a variety of ways. In some cases, the authentication system 120 communicates the block entries as they are generated and/or one at a time. For example, the authentication system 120 can communicate a block entry to the distributed electronic ledger system 150 each time a new version of a data file is created or stored. In certain embodiments, the authentication system 120 communicates groups of block entries together. For example, the authentication system 120 can communicate block entries according to a predetermined time interval or based on a number or size of the block entries to be communicated. In certain embodiments, the authentication system 120 can communicate a group of block entries each time it wants the distributed electronic ledger system 150 to generate a block or ledger entry. In some embodiments, the authentication system 120 can group related block entries and communicate the related block entries as a group to the distributed electronic ledger system 150. For example, the authentication system 120 can group block entries relating to the same data file, share a similar characteristic, or are associated with data that shares a similar characteristic, such as, but not limited to, a common ID, type, created date, status, location, name, batch identifier, strain identifier, other attributes, etc. The authentication system 120 can use any one or any combination of the aforementioned techniques to communicate block entries to the distributed electronic ledger system 150. In certain embodiments, the authentication system 120 communicate one or more block entries to a queue and the distributed electronic ledger system 150 can receive the block entries from the queue.

In some embodiments, the authentication system 120 can encrypt the block entries that it communicates to the distributed electronic ledger system 150. For example, using a private key of a key pair, the authentication system 120 can encrypt a block entry. The distributed electronic ledger system 150 can decrypt the block entry using a public key of the same key pair. In this way, the authentication system 120 can authenticate itself to the distributed electronic ledger system 150 and distributed electronic ledger system 150 can confirm that the received data came from the authentication system 120.

The authentication system 120 can store (e.g., in storage system 130) retrieval information associated with the content identifiers and/or block entries. The retrieval information can be used by the distributed electronic ledger system 150 to retrieve the content identifier and/or block entry. In some cases, the retrieval information can include an address or other identifier that can be sent to the distributed electronic ledger system 150 and enable the distributed electronic ledger system 150 to locate and retrieve a block entry or content identifier and return it to the authentication system 120. For example, the retrieval information can include a location or address of the content identifier, a block entry identifier of the block entry on a block of the blockchain that includes the relevant content identifier, a transaction identifier associated with the block or block entry that stores the relevant content identifier, a block identifier identifying the block of a blockchain that stores the relevant content identifier, distributed electronic ledger system identifier identifying the distributed electronic ledger system 150 that has the relevant content identifier, etc. In some cases, once the distributed electronic ledger system 150 stores the block entry or group of block entries, it can communicate retrieval information to the authentication system 120 for storage, for example in the storage system 130.

In some embodiments, the authentication system 120 can retrieve one, some, or all versions of a data file from the storage system 130 and can validate each of the retrieved versions. For example, the authentication system 120 may retrieve data files from the storage system 130 in response to receiving a request for the data file from a client computing device 110. In some embodiments, the authentication system 120 retrieves at least one version of the data file from the storage system 130. For example, the authentication system 120 may retrieve the most recent version of the data file, most recently validated version of the data file, an original version of the data file, or another version of the data file. In some such cases, the authentication system 120 can determine the validity of and/or provide the client computing device 110 with at least the latest version of the data file. In some embodiments, the authentication system 120 retrieves a plurality of versions of the data file. For example, the authentication system 120 may retrieve a set of the most recent versions of the data file, a set of the most recently validated versions of the data file, a sampling (e.g., random, specific) of versions of the data file, etc. In some embodiments, the authentication system 120 retrieves all versions of the data file. Consider an example in which the client computing device 110 requests Data File A from the authentication system 120. In response, the authentication system 120 can retrieve all versions of Data File A from the storage system 130, generate a content identifier for each version of Data File A, request block entries and/or content identifiers for each version of Data File A, and perform a validation (e.g., by comparing the generated content identifiers and received content identifiers) for each version. However, it will be understood that any subset of the versions of Data File A can be validated as part of the authentication process of Data File A. For example, the authentication system 120 may retrieve only the most previous version of Data File A or the previous two or five versions of Data File A, etc.

In certain embodiments, the authentication system 120 may perform a pre-validation or temporary validation of a data file. For example, in some cases, the authentication system 120 may store (e.g., in storage system 130) content identifiers for some or all versions of a data file. For example, the authentication system 120 may have previously generated a content identifier for a particular version of a data file and stored that content identifier in the storage system 130. As part of the pre- or temporary validation, the authentication system 120 may retrieve, from the storage system 130, one, some, or all versions of the requested data file, as well as the content identifiers for those retrieved versions. The authentication system 120 may then generate content identifiers and compare the generated content identifiers with the content identifiers retrieved from the storage system 130. In some cases, if the generated content identifiers match the content identifiers retrieved from the storage system 130, the authentication system 120 can at least temporarily validate that version of the data file and provide to the client computing device 110. Although performing a pre-validation or temporary validation of a data file may chance an incorrect result (e.g., an indication that a non-validated data file is otherwise validated), by providing the temporary validation of the data file to the client computing device 110 before receiving the content identifiers from the distributed electronic ledger system 150 and/or comparing generated content identifiers with the content identifiers received from the distributed electronic ledger system 150, the authentication system 120 can reduce the time to partially authenticate a data file and/or provide it to the user.

In certain embodiments, the authentication system 120 may perform a validation of a data file. For example, the authentication system 120 can request a block entry from the distributed electronic ledger system 150 that corresponds to one or multiple data files (e.g., multiple versions of a data file) and use the requested block entry to authenticate the one or multiple data files. The authentication system 120 can compare the recently generated content identifier with the content identifier received from the distributed electronic ledger system 150. Based on the comparison, the authentication system 120 can authenticate the data file or determine that the data file has been modified.

As a non-limiting example, consider a scenario in which the authentication system 120 receives a request for Data File A from a client computing device 110. For this example, assume there have been four versions (Version 1, Version 2, Version 3, Version 4) associated with Data File A, where Version 1 is the original data file and Versions 2, 3, and 4 are successive versions, with Version 4 being the most recent version of Data File A. Further, in this example, the storage system 130 stores a copy of each of the four versions. In response to receiving the request from the client computing device 110, the authentication system 120 retrieves at least Version 4 (i.e., the latest version) from the storage system 130, but may also retrieve some or all of the remaining versions. In this example, the authentication system 120 retrieves all four versions (Version 1, Version 2, Version 3, and Version 4) from the storage system 130. Continuing with the example, the authentication system 120 generates a content identifier for each of the retrieved versions. The content identifiers generated by the authentication system 120 at the time of the authentication process/data file request may be referred to as "authentication content identifiers." Furthermore, the authentication system 120 requests content identifiers for those versions from the distributed electronic ledger system 150. The content identifiers stored by the distributed electronic ledger system 150 may be referred to as "blockchain content identifiers." If the authentication content identifiers match their respective blockchain content identifiers, the authentication system 120 can validate the versions of Data File A and can communicate Version 4 of Data File A to the client computing device 110. In some cases, the delay between receiving the request for the data file from the client computing device 110 and providing the data file to the client computing device 110 is less than one second, less than one minute, less than three minutes, less than five minutes, or less than eight minutes.

Conversely, if the authentication system 120 determines that one or more authentication content identifiers do not match the blockchain content identifiers, the authentication system 120 can provide an indication to the computing device 110 that the data file is not validated. For example, in the event a data file is invalid, the authentication system 120 can return an error message and/or HTTP bad request status code. As described herein, if the authentication content identifier does not match a corresponding blockchain content identifier, it can indicate that some data was modified (e.g., either the data file stored in the storage system 130 or the content identifier stored in the distributed electronic ledger system 150). In some cases, the invalidity determination can be associated with the version(s) that were deemed invalid and/or any subsequent version such that some or all data files impacted by the invalid data file can be identified. In some cases, despite the determination that at least one version of a data file is not valid, the authentication system 120 may nonetheless communicate a version of the data file to the client computing device 110. For example, the authentication system 120 may communicate a latest version (in this cases, Version 4), along with the indication of the error. As another example, the authentication system 120 may communicate a version corresponding to the last known valid state or the latest valid version (e.g., the most recent version that was validated). In addition, the authentication system 120 can enable a user to compare the last known valid version with the current version to identify potential unauthorized changes.

In some cases, the storage system 130 can correspond to cloud storage, such as Amazon Simple Storage Service (S3) or Elastic Block Storage (EBS), Google Cloud Storage, Microsoft Azure Storage, etc. In some cases, the storage system 130 can correspond to a database such as SQL, Mongo, CosmosDB, etc. The storage system 130 can be made up of one or more data stores storing data that has been received from one or more of the client computing device 110, authentication system 120, logic system 140, or distributed electronic ledger system 150. In some cases, the storage system 130 is part of one or more other components of the environment 100, such as local storage for one or more of the client computing device 110, authentication system 120, logic system 140, or distributed electronic ledger system 150.

As described herein, the storage system 130 can store data relating to one or more data files. In some cases, the storage system 130 is a database that includes some or all the edits to, and/or historical versions of, one or more data file or files. For example, the storage system 130 may store a copy of one, some, or all historical or current versions of a data file. As another example, in some cases, the storage system 130 may store content identifiers for one, some, or all versions of one or more data files. As another example, the storage system 130 may store retrieval information useful for retrieving or locating data in the distributed electronic ledger system 150 or another storage system. Depending on the embodiment, the storage system 130 may be managed or populated by one or more of the client computing device 110, authentication system 120, logic system 140, or distributed electronic ledger system 150. In some cases, a new version of a data file can be created and stored each time a user saves the data file (e.g., by clicking a save button, closing the data file, etc.). In this way, the entire history of the data file can be retained. In certain cases, newer versions are saved separately from older versions such that the newer versions do not overwrite the older versions. In some cases, newer versions never overwrite older versions.

The logic system 140 can be configured to provide logic or instructions regarding discrepancies or conflicts between different versions of a data file. As described herein, for various reasons, the authentication system 120 may determine that a data file is not authenticated. For example, as described herein, the authentication system 120 may determine that a version of a data file stored in the storage system 130 is not congruous with a content identifier stored on the distributed electronic ledger system 150. In some cases, if the authentication system 120 determines that a version of a data file is not authenticated, it can return an indication of an error to the client computing device 110. In addition or alternatively, in some cases, if the authentication system 120 determines that a version of a data file is not authenticated, the logic system 140 can analyze that version (and possibly another version) to attempt to identify and/or correct any discrepancies or conflicts between versions. For example, consider a scenario in which a farmer indicates that he had 10 lbs. of a product on Day 1 (represented in the system as version 3 of a data file) and on Day 2 a government worker measured 9.5 lbs. of the product (represented in the system as version 4 of the data file). In some cases, the logic system 140 can identify this discrepancy as an error and/or ignore it. For example, the logic system 140 may determine that the discrepancy is minor (e.g., numerical difference is within an acceptable threshold), or the logic system 140 may determine that the discrepancy is significant and indicate an error or warning, and require the farmer to correct the discrepancy or provide an explanation.

The distributed electronic ledger system 150 can communicate with one or more of the client computing device 110, authentication system 120, storage system 130, or logic system 140. The distributed electronic ledger system 150 can be digital system for recording the transaction of assets in which the transactions and/or their details are recorded in multiple places at the same or a similar time. Non-limiting examples of a distributed electronic ledger system 150 include, but are not limited to, Ethereum, Hyperledger, Quorum, Guardtime KSI, etc.

Figure 2:
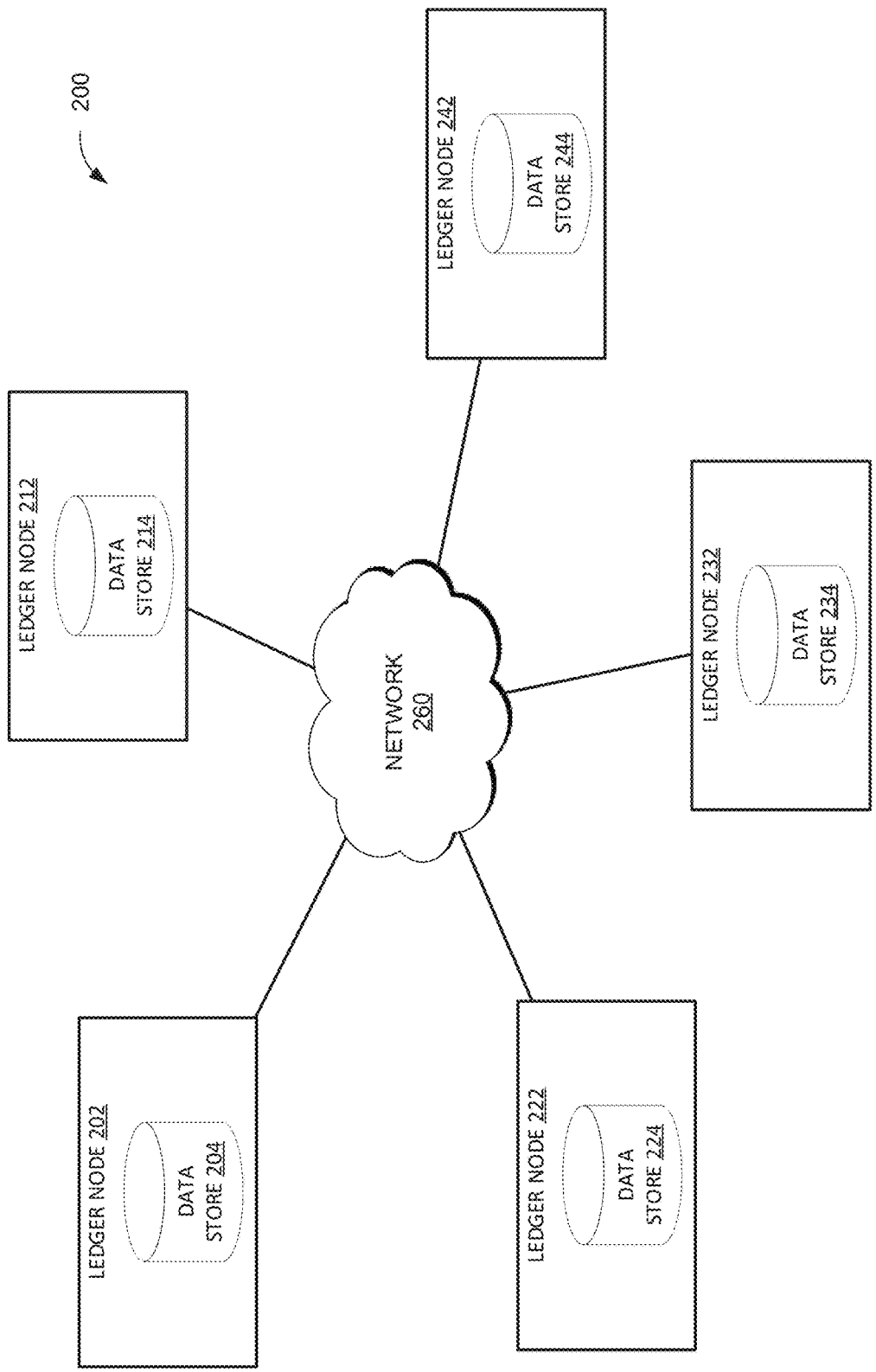
FIG. 2 is a block diagram illustrating an embodiment of a distributed electronic ledger system.

FIG. 2 is a block diagram illustrating an embodiment of a distributed electronic ledger system 250 that provides one or more distributed ledgers or blockchains across one or more ledger nodes 202, 212, 222, 232, and 242. Each ledger node 202, 212, 222, 232, and 242 can be associated with a data store 204, 214, 224, 234, and 244, respectively, and can be implemented using individual computing devices, distributed processing systems, servers, isolated execution environments (e.g., virtual machines, etc.), shared computing resources, and so on. In addition, the ledger nodes 202, 212, 222, 232, and 242 can communicate via a network 260. The network 260 can be the same as network 160 or a different public or private network. The distributed electronic ledger system 250 can be an embodiment of the distributed electronic ledger system 150 of FIG. 1. Non-limiting examples of a distributed electronic ledger system 150 include, but are not limited to, Ethereum, Hyperledger, Quorum, Guardtime KSI, etc.

The ledger nodes 202, 212, 222, 232, and 242 can store, maintain and/or update the distributed ledgers on their respective data stores. Each ledger node 202, 212, 222, 232, and 242 can be configured for storing a version of the distributed ledger (or a portion thereof), and the distributed ledger may be updated from time to time with modifications to the ledger and/or ledger entries, such as insertion of a ledger entry (also referred to herein as a block or block entry) or an update of a ledger entry. The distributed electronic ledger system 250 may be adapted such that where issues arise with the distributed ledger (e.g., hash collisions, insertions at the same time, corrupted ledgers/ledger entries), the issues are resolved based at least on issue resolution logic. For example, such logic may be distributed among each of the ledger nodes 202, 212, 222, 232, and 242 and/or their computing systems. In some embodiments, issues may arise that can cause a distributed ledger to "fork" and/or spawn another instance, for example, where a collision cannot be automatically resolved.

As described herein, the ledger nodes 202, 212, 222, 232, and 242 can include at least a decentralized set of computing devices and may even include personal computing devices for individuals, and so on. For example, a ledger may be stored on a large number of publicly available devices, each acting as a "node" for storing a copy of the ledger (e.g., being collaboratively maintained by anonymous peers on a network). In some embodiments, the ledger is only stored and maintained on a set of trusted "nodes", such as on a private network or on the computing systems of authorized users. In some embodiments, a combination and/or a "mix" of both trusted nodes and public nodes may be utilized, with the same and/or different rules being applied to activities performed at each (e.g., a different validation process may be used for untrusted nodes, or simply untrusted nodes may be unable to perform certain activities). In some embodiments, there may be different levels of nodes with differing characteristics and applied logic.

The ledgers, ledger entries, and/or information stored on the ledger entries may be used to store information received from the authentication system 120. As described herein, the information received can include, but is not limited to, one or more content identifiers, file identifiers, system identifiers, version identifiers, type identifiers, product identifiers, date/time identifiers, a hash, Nonce, or other metadata, etc. In some cases, a smart contract (contract asset summary) is generated include various data fields, such as, but not limited to, data file ID (e.g., the ID of the target data file), data file type (e.g., the type of data file such as Plant, Purchase Order, Manifest), data file version (e.g., the version of the data file), data file hash (e.g., the SHA256 hash of the data file). In addition, a transaction receipt can be generated.

Moreover, in some cases, the block entry can include or be a content identifier generated from the content of a data file. In some cases, the distributed electronic ledger system 250 can store the block entry (or at least a portion of its content) as part of a distributed ledger or blockchain. Further, the ledger and ledger entries may utilize encryption technology to facilitate and/or validate digital signatures or the data received from the authentication system 120.

In some embodiments, the ledger is publicly accessible. In some embodiments, the ledger is only accessible to select, authorized ledger nodes having the appropriate permissions. In some embodiments, portions of the ledger are public and portions of the ledger are private. When the ledger is publicly accessible, the ledger may be adapted to only store information incidental to a transaction or a data file relating to a vehicle, and may be adapted such that identifiable information is removed but validation information is maintained (e.g., storing a hash value computed from the underlying information). Further, the information stored on the ledger may be encrypted (non-limiting example: using a public key of a key pair associated with the authentication system 120), redacted, compressed, transformed (e.g., through a one-way transformation or a reversible transformation), and so on.

Each of the one or more ledger nodes 202, 212, 222, 232, and 242 may have, at various times, versions of the ledger, and the ledger may be maintained through the propagation of entries and/or updates that may be copied across ledgers. Ledger entries may contain elements of information (e.g., header information and/or data received from the authentication system 120). There may be various rules and/or logic involved in activities relating to the ledger entries (e.g., creating, updating, validating, deleting), for example, a majority, supermajority or unanimous consent between ledger nodes may be enforced as a condition to an activity relating to an entry. In some embodiments, distributed ledgers are utilized and the ledger entries are adapted to have various linkages to one another such that the integrity of the ledger entries can be reinforced and/or validated. For example, the linkages may include hashes computed based on prior entries in the ledger, which may be utilized to determine whether a ledger entry is a fraudulent entry by reviewing the correctness of the hash based on performing the hash on information stored on prior entries.

The ledger may be maintained through, for example, a "distributed network system", the distributed network system providing decentralized control and storage of the ledger at the one or more ledger nodes (which may be considered "nodes" of the system). The number of "nodes" may be fixed or vary with time, and increasing or decreasing the number of "nodes" may impact the performance and/or security of the system. The ledger copies stored and maintained at each "node" provide cross-validation with one another in the event of conflicts between ledgers, and various cryptographic and/or hashing algorithms may be utilized during the generation, updating, deletion, linking, and so on, of ledger entries such that ledger entries have increased resiliency to unauthorized tampering or modification.

For example, a blockchain ledger may be distributed across ledger nodes 202, 212, 222, 232, and 242 and used to track information received from the authentication system 120, etc. The blockchain ledger may have entries linked to one another using cryptographic records, and entries in the blockchain may be ordered, time stamped, and/or associated with metadata such that the blockchain is designed for protection against "double" transfers and unauthorized modification of ledger entries.

The distributed electronic ledger system 250 can generate blocks as part of a blockchain or ledger in a variety of ways, such as, but not limited to, the passage of a predetermined time interval, the size or amount of data received from various systems, the number of block entries or generated content identifiers received from one or more systems, a communication or instruction received from the authentication system 120, etc. In some embodiments, the distributed electronic ledger system 250 can generate a block based on a predetermined period of time. For example, the distributed electronic ledger system 250 can generate a block for the blockchain once a second, every 10 seconds, once a minute, every 10 min., every hour, etc. In certain embodiments, the distributed electronic ledger system 250 can generate a block based on the size or amount of data received from the authentication system 120 or another system. For example, the distributed electronic ledger system 250 can generate a block for each megabyte or gigabyte of data received from the authentication system 120. In some cases, the distributed electronic ledger system 250 can generate a block based on a number of block entries or content identifiers received from the authentication system 120. For example, the distributed electronic ledger system 250 can generate a block for each block entry or each set of 100, 1000, or 1,000,000 block entries or content identifiers received from the authentication system 120. In certain embodiments, such as when the authentication system 120 communicates block entries as a group, the distributed electronic ledger system 250 can generate a block each time a group of block entries is received. The distributed electronic ledger system 250 can use any one or any combination of the aforementioned techniques to generate a block.

Each block can include one or more block entries. As described herein, a block entry can include various pieces of information, including, but not limited to, a content identifier (corresponding to the content identifier received from the authentication system 120), data file ID, data file Type (e.g., contract, plant, purchase order, manifest), version identifier (e.g., the version of the data file), transaction date, etc.

In addition, each block can include a header. The header can include a content identifier of all of the contents of the block (e.g., a hash of all of the block entries in the block), a previous block ID of a block that precedes the block, and/or a block ID for the block. In certain cases, the block ID for the block can be generated by hashing the content ID of the block with the previous block ID.

Authenticating a Data File for Use

Distributed ledger technologies can provide a number of benefits including transparency, security, and traceability, to name a few. However, for various reasons (e.g., cost, data storage restrictions, privacy concerns), it may not be desirable to store a copy of a data file on a distributed electronic ledger system 150. Rather, hashes take up just a small fraction of this space and are often a much more efficient option. Furthermore, because a hash of a data file is treated as a unique identifier to that data file, comparing hashes of data files (rather than the contents of the data files) is a computationally efficient way to identify whether two or more data files (or two or more versions of a data file) contain identical contents. Although storing hashes in a distributed electronic ledger system 150 may provide advantages, it is not without its limitations. In particular, because hash functions are generally not reversible, the hash functions themselves are generally not useful for resolving conflicts or discrepancies between the contents of data files.

As described herein, the environment 100 can include an authentication system 120 along with the distributed electronic ledger system 150 to realize advantages associated with a distributed ledger, while also retaining a running history of data file versions and performing authentications, which can further improve traceability, discrepancy resolution, etc. The environment 100 includes a storage system 130 that stores a running history of data file versions, as well as retrieval information that can be used be to retrieve associated ledger entries from a distributed electronic ledger system 150. When a client computing device 110 requests a data file, an authentication system 120 performs an authentication process. The authentication process can be performed before, after, or during the data file retrieval. During the authentication process, the authentication system 120 retrieves at least the most recent version of the data file and retrieval information associated with each retrieved version, generates a content identifier (also referred to herein as an authentication content identifier) for each retrieved version, provides the retrieval information to request the distributed electronic ledger system 150 to return one or more stored content identifier(s) (also referred to herein as a blockchain content identifier) that is associated with the retrieved version(s), and compares the authentication content identifier and blockchain content identifier to determine whether to authenticate the version(s) of the data file.

Consider an example in which the Data File A is associated with two versions: Version 1 (the original Data File) and Version 2 (a modified version of Version 1). If the client computing device 110 requests Data File A, the authentication system 120 can retrieve a copy of Version 2, as well as corresponding retrieval information that can be used be to retrieve a ledger entry associated with a blockchain content identifier for Version 2. Using the retrieval information, the authentication system 120 can request the blockchain content identifier for Version 2 from the distributed electronic ledger system 150. Furthermore, the authentication system 120 can generate an authentication content identifier using the copy of Version 2. If the authentication content identifier matches the blockchain content identifier, the authentication system 120 can authenticate Version 2 and communicate it to the client computing device 110.

In contrast, if the authentication content identifier does not match the blockchain content identifier, the authentication system 120 can determine that either the copy of Version 2 stored at the authentication system 120 or the content identifier of Version 2 stored in distributed electronic ledger system 150 may have been modified (e.g., corrupted, mistakenly modified, modified by a bad actor, etc.) since the content identifier of Version 2 was stored in distributed electronic ledger system 150. In some such cases, the authentication system 120 can inform the client computing device 110 of the discrepancy and, in some cases, can prevent the creation of additional versions of the data file until the discrepancy is resolved. By generating its own content identifier based on the content of the data file and then comparing the generated content identifier with a previously generated content identifier that was stored on the distributed electronic ledger system 150, the authentication system 120 can validate the integrity of the version of the data file it provides to the client computing device 110 and confirm that the data file has not been modified without authorization.

Figure 3:
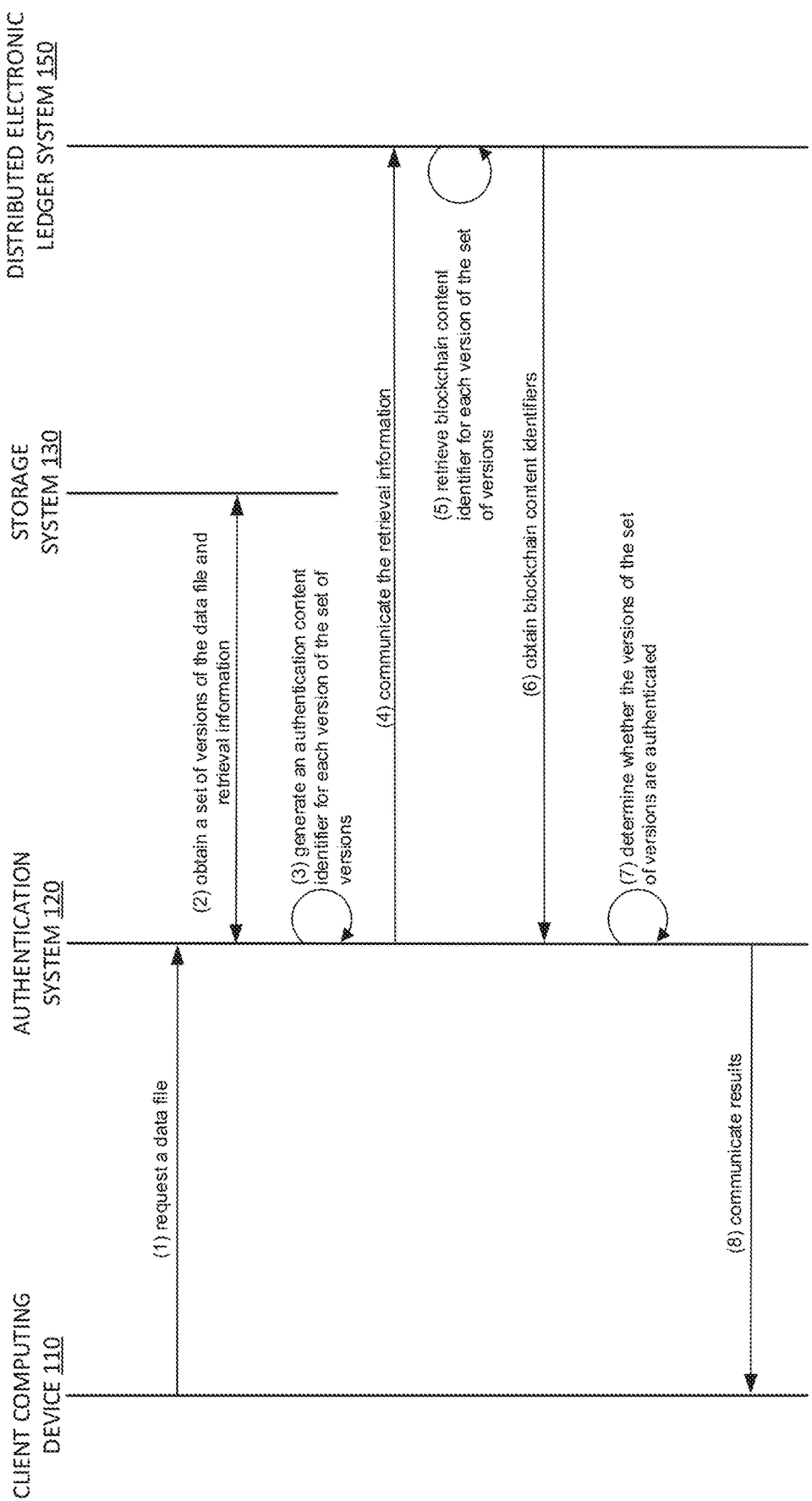
FIG. 3 is a data flow diagram illustrating an embodiment of data flow and communications for authenticating data.

FIG. 3 is a data flow diagram illustrating an embodiment of data flow and communications for authenticating data. The data flow diagram of FIG. 3 illustrates an example of data flow and communications between the client computing device 110, the authentication system 120, the storage system 130, and/or the distributed electronic ledger system 150. However, it will be understood, that in some of embodiments, one or more of the functions described herein with respect to FIG. 3 can be omitted, performed concurrently, or in a different order and/or performed by a different component of the environment 100. Accordingly, the illustrated embodiment and description should not be construed as limiting.

At (1), the client computing device 110 requests a data file from the authentication system 120. The client computing device 110 may request a data file using various techniques. For example, as described herein, the client computing device 110 may host or execute one or more client applications 112 that are capable of interacting with the authentication system 120. For instance, a client application 112 may be or comprise a web browser, mobile apps, or the like that enable user interaction. In some such cases, the request for the data file can occur in response to a user selection. For example, clicking a link, attempting to open data file, navigating to a particular location, etc. can open a connection to the authentication system 120 and/or send the request. In some cases, the request for the data file includes a request for a particular version of the data file, such as a data file created within, before, or after a particular time window or on a particular date. In some cases, the request for the data file includes a request for the data file without specification to the version. In some such cases, the request can be considered a request for a latest or more recent version of the data file.

In some cases, the data file may be related to supply chain management. For example, the data file may include one or more inventory-related fields. As a non-limiting example relating to agriculture logistics, the data file can include one or more fields including, but not limited to, product identifier, data file version, product type (e.g., Jersey Cow, Gurnsey Cow, Cavendish Banana, OG Kush), data file creation date, product creation date, product status (e.g., Calf, Cow, Seedling, Vegetative, Flowering, Harvested), product location (e.g., greenhouse, yard, field), product attributes, other data file information (edit date, identifier of editor, etc.). As a non-limiting example relating to retail products, the data file can include one or more fields including, but not limited to, product identifier, data file version, product type, data file creation date, other data file information (name, edit date, identifier of editor, etc.), batch identifier, strain identifier, etc. In some cases, different parts of the data file may be editable by different parties, such as different organizations (e.g., farmers, suppliers, government testers, retailers, etc.).

At (2), the authentication system 120 obtains a set of versions of the data file from the storage system 130. As described, the storage system 130 can store a complete or partial history of the data file. For example, in some cases, the storage system 130 stores a copy of each version of the data file since the data file's creation. As another example, in some cases, the storage system 130 stores some subset of all of the versions of the data file. For instance, the storage system 130 may store a threshold number of versions (e.g., the last 5 or 10 versions), versions created before or after a particular date, a partial sampling of all of the versions, etc. In some cases, the storage system 130 is populated by the authentication system 120. For example, as described herein at least with reference to FIG. 5, in some cases, the authentication system 120 can communicate a copy of each newly generated version of a data file to the storage system 130. In some such cases, the storage system 130 can retain a copy of all versions of a data file, unless or until they are overridden or deleted.

The set of versions obtained by the authentication system 120 can vary across embodiments. For instance, depending on the embodiment, the authentication system 120 may retrieve one, some, or all versions of the data file from the storage system 130. In some cases, the number of versions and/or which particular version(s) the authentication system 120 retrieves can be based on the desired scope of authentication. For example, in some cases, the authentication system 120 retrieves one version of the data file from the storage system 130, such as the most recent version or most recently edited version of the data file. In some such cases, the authentication system 120 authenticates what is likely the latest iteration of the data file, with the latest edits or modifications. As another example, the authentication system 120 may retrieve the original version of the data file or a most recently authenticated version of the data file. In some embodiments, the authentication system 120 retrieves a plurality of versions of the data file. For example, the authentication system 120 may retrieve a set of the most recent versions of the data file (e.g., the last 5 or 10 versions), a set of the most recently validated versions of the data file, a sampling (e.g., random or non-random sampling) of versions of the data file, etc. In some embodiments, the authentication system 120 retrieves all versions of the data file or all versions of the data file stored by the storage system 130. In some such cases, the authentication system 120 can authenticate or re-authenticate some or all versions of the data file.

Furthermore, at (2), the authentication system 120 obtains retrieval information for each version of the set of versions it obtains from the storage system 130. As described, the storage system 130 can store retrieval information associated with ledger entries stored in the distributed electronic ledger system 150. In particular, the ledger entries can include or be associated with blockchain content identifiers, which are previously generated content identifiers for the various versions of the data file stored in the storage system 130. For example, as described herein at least with reference to FIG. 5, the authentication system 120 can communicate a content identifier to the distributed electronic ledger system 150 for storage, the distributed electronic ledger system 150 can communicate retrieval information associated with that stored content identifier to the authentication system 120, and the authentication system 120 can store a copy of the retrieval information in the storage system 130. By storing retrieval information in the storage system 130, the authentication system 120 can facilitate efficient retrieval of the data stored in the distributed electronic ledger system 150.

As described herein, the retrieval information can include, but is not limited to, an address or other identifier that can be sent to the distributed electronic ledger system 150 and enable the distributed electronic ledger system 150 to locate and retrieve a ledger entry or content identifier. For example, the retrieval information can include a location of a content identifier and/or ledger entry on the distributed electronic ledger system 150, a transaction identifier, block identifier, block entry identifier, ledger identifier, etc.

At (3), the authentication system 120 generates an authentication content identifier for each version of the set of versions retrieved from the storage system 130. As described herein, for ease of reference, a content identifier may be referred to as an authentication content identifier or a blockchain content identifier depending on when the content identifier was generated or where the content identifier is stored. For example, a newly generated content identifier may be (at least temporarily) be referred to as an authentication content identifier and a content identifier stored by the distributed electronic ledger system 150 may be referred to as a blockchain content identifier. However, it will be understood that the terms content identifier, authentication content identifier, and blockchain content identifier may refer to the same identifier at different stages of authentication and/or may be used interchangeably, and therefore should not be deemed limiting. As another example, the authentication content identifier may also be referred to as a generated content identifier and a blockchain content identifier may also be referred to as a stored content identifier.

In certain embodiments, the authentication system 120 generates a content identifier using a hash function (non-limiting examples: SHA-256, SHA-3, custom hash function, etc.), fingerprint function, lossy compression algorithm, tokenization function, or other algorithm that can generate a unique identifier based on a data input and/or map data of arbitrary size to data of a smaller or fixed size.

In some embodiments, the content identifier can correspond to a hash, fingerprint, checksum, lossy compression output, token, or other identifier that is generated from the content of a particular version of a particular data file, and/or in some or all cases, uniquely identifies the content of the version of the data file from the content of other versions of the data file and/or other data files processed or stored by the authentication system 120, and/or the distributed electronic ledger system 150. In some cases, the authentication system 120 generates a content identifier by generating a hash of data associated with the particular version of the data file (non-limiting examples: metadata, data fields, etc.) or the entire contents of the particular version of the data file.

At (4), the authentication system 120 communicates the retrieval information to the distributed electronic ledger system 150. As described, the retrieval information can be used by the distributed electronic ledger system 150 to retrieve the block entry or entries and/or content identifier(s) associated with the set of versions that the authentication system 120 retrieved from the storage system 130. In certain embodiments, the communication of the retrieval information to the distributed electronic ledger system 150 functions as a request for the blockchain content identifier(s) stored on the distributed electronic ledger system 150 and associated with the set of versions.

At (5), the distributed electronic ledger system 150 uses the retrieval information to identify ledger entries (e.g., block entries) and/or blockchain content identifiers. In some cases, the retrieval information can include an address or other identifier that enables the distributed electronic ledger system 150 to efficiently locate and retrieve a block entry or content identifier and return it to the authentication system 120. For example, the distributed electronic ledger system 150 can use the information received from the authentication system 120 to locate a block entry with information that matches at least a portion of the received information. Once the block entry is identified or located, the distributed electronic ledger system 150 can send the requested information to the authentication system 120. For example, if a content identifier is requested, the distributed electronic ledger system 150 can communicate the content identifier to the authentication system 120. In some cases, the distributed electronic ledger system 150 can communicate all content of an identified block entry to the authentication system 120.

As described herein, the authentication system 120 previously generated (or received) content identifiers and/or communicated them to the distributed electronic ledger system 150 as part of a block entry. In some cases, the block entry can include additional information, such as, but not limited to, a file identifier, a system identifier, a version identifier, a type identifier, a product identifier, a date/time identifier, a hash, Nonce, or other metadata, etc. Moreover, in some cases, the block entry can include or be a content identifier generated from a combination of the additional information and the content identifier. In turn, the distributed electronic ledger system 150 can store the block entry (or at least a portion of its content) as part of a distributed ledger or blockchain.

The blockchain content identifier(s) of a block entry can correspond to the content identifier(s) generated based on the versions of the data file. In some cases, the blockchain content identifier can be a hash of the content of a data file. In some cases, a block entry can include multiple content identifiers. For example, if the authentication system 120 generates a hash for the data file, the corresponding block entry can include the hash for the data file. In some embodiments, the block entry can include a hash identifier that is based on multiple versions of a data file. As described herein, the blockchain content identifier(s) can be used to authenticate the versions of the data file retrieved by the authentication system 120.

At (6), the distributed electronic ledger system 150 communicates the blockchain content identifier(s) to the authentication system 120. As described, in some cases, the authentication system 120 can receive or obtain one or more block entries that include the one or more blockchain content identifiers.

At (7), the authentication system 120 verifies the set of versions. For example, using the information received from the distributed electronic ledger system 150, the authentication system 120 can determine whether the content identifier(s) generated as part of the authentication process (also referred to herein as an authentication content identifier) match the respective blockchain content identifier(s). Based on the comparison, the authentication system 120 can authenticate the set of versions or determine that one or more of the versions has been modified. In certain embodiments, to authenticate the set of versions, the authentication system 120 compares the authentication content identifier of a version with the corresponding blockchain content identifier of the version. If the content identifiers match, the authentication system 120 determines that the version is authenticated.

As described, in some cases, the set of versions retrieved from the storage system 130 can include multiple versions. In some such cases, the authentication system 120 can authenticate each version. In certain cases, the authentication system 120 may authenticate some versions (e.g., versions where the generated content identifier matches the corresponding stored content identifier) and may not authenticate other versions (e.g., versions where the generated content identifier does not match the corresponding stored content identifier). In some cases, if any of the content identifiers for any of the versions do not match, then none of the versions are authenticated. In certain cases, if a content identifier for a particular version does not match, only that version is not authenticated. In some cases, even if some of the content identifiers do not match, a particular version may be authenticated. For example, if the authentication and blockchain content identifiers for the most recent version or the original version of the data file match, then the respective version of the data file may be authenticated despite other versions not being authenticated.

As described herein, in certain embodiments, the authentication content identifier and blockchain content identifier can correspond to the version(s) of the data file to be authenticated. For example, the authentication content identifier can be generated based on (e.g., using the content or content identifiers associated with) the version(s) of the data file retrieved from the storage system 130 at the time of authentication and the blockchain content identifier can correspond to the content identifier stored in the distributed electronic ledger system 150 (and that was previously generated when the version of the data file was saved).

At (8), the authentication system 120 communicates results of the authentication to the client computing device 110. In some cases, the results can include a copy of the authenticated version, or latest authenticated version, of the data file. In some cases, the results can include an indication that the data file was not authenticated.

In some embodiments, if the authentication content identifiers match their respective blockchain content identifiers, the authentication system 120 can validate the set of versions of the data file can communicate a validated version of the data file to the client computing device 110. For example, if the authentication process passes (i.e., the versions are authenticated), the authentication system 120 may communicate the latest version of the data file to the client computing device 110. In some cases, the delay between receiving the request for the data file from the client computing device 110 and providing the data file to the client computing device 110 is less than one second.

In some embodiments, if the authentication system 120 determines that one or more authentication content identifiers do not match the blockchain content identifiers, the authentication system 120 can provide an indication to the computing device 110 that the data file (or a version of the data file) is not validated. For example, in the event the authentication device determines that a version is not authenticated (or is invalid), the authentication system 120 can return an error message and/or HTTP bad request status code to the client computing device 110. As described herein, an invalid version may be indicative of an unauthorized modification to the data file.

In some cases, the invalidity determination can be associated with the version(s) that were deemed invalid and/or any subsequent version such that some or all data files impacted by the invalid data file can be identified. In some cases, despite the determination that a data file is not valid, the authentication system 120 may nonetheless communicate a version of the data file to the client computing device 110. For example, the authentication system 120 may communicate a latest version (in this cases, Version 4), along with the indication of the error. As another example, the authentication system 120 may communicate a version corresponding to the last known valid state or the latest valid version.

In some cases, such as when the authentication system 120 authenticates multiple or all versions of a data file, the authentication system 120 can communicate an indication of each authenticated version to the client computing device 110. For example, the client computing device 110 may have requested a data file that has ten versions. In response, the authentication system 120 can authenticate all ten versions and communicate an indication of the authentication to the client computing device 110 along with the tenth version of the requested data file. In certain embodiments, the authentication system 120 can also communicate the authenticated versions to the client computing device 110. For example, in addition to the tenth version (most recent version) of the data file, the authentication system 120 can make the first nine versions available to the user of the client computing device 110. In this way, the user can easily review the changes between the different versions of the data file as well as have confidence in the integrity of each version.

In some cases, such as when the authentication system 120 attempts to store a content identifier in the distributed electronic ledger system 150 (e.g., as described herein at least with reference to FIG. 5) and retrieve that same content identifier from the distributed electronic ledger system 150 within a short period of time, the content identifier may not yet be stored as a ledger entry in the distributed ledger. For example, as described herein, the authentication system 120 may include a queue that temporarily stores content identifiers (or other information to be communicated to the distributed electronic ledger system 150) until the content identifiers can be processed by the distributed electronic ledger system 150 (e.g., added to the distributed ledger).

In some cases, the authentication system 120 may wait to communicate the content identifier for a new version of a data file until the distributed electronic ledger system 150 processes and stores the content identifier of the preceding version of the data file from the queue. In some cases, the authentication system 120 can include a queue for each data file. In some such cases, the authentication system 120 can concurrently communicate versions of different data files to the distributed electronic ledger system 150 while sequentially communicating different versions of the same data file to the electronic ledger system.

In certain cases, the distributed electronic ledger system 150 and/or the authentication system 120 can retrieve the content identifier of interest from the queue, rather than from the distributed ledger. As described herein, the distributed electronic ledger system 150 can communicate an acknowledgment to the authentication system 120 when a content identifier for a particular version of a data file is stored in the distributed ledger. As described herein, the acknowledgment can include retrieval information for the content identifier. In some cases, the distributed electronic ledger system 150 and/or the authentication system 120 can retrieve the content identifier from the queue based on a determination that the distributed electronic ledger system 150 has not communicated and/or the authentication system 120 has not received the acknowledgement. For example, if the authentication system 120 determines that the retrieval information for a requested version of a data file is not stored in the storage system, the authentication system 120 can check the queue for the content identifier. If the content identifier is found in the queue, the authentication system 120 can use it to authenticate or pre-authenticate the requested version. Once the acknowledgement is received, the authentication system 120 can retrieve the content identifier from the distributed electronic ledger system as described herein.

In some cases, such as when the authentication system 120 attempts to retrieve a content identifier that has not yet been stored to the distributed electronic ledger system 150, there may be no content identifier to retrieve. For example, in some cases, as described above, the content identifier may be pending in the queue. As another example, in some cases, the content identifier may not be found in the distributed electronic ledger system 150. In some such cases, the authentication system 120 may determine to communicate an error notification to the client computing device 110. In addition or alternatively, in some cases (e.g., such as when the content identifier is in the queue), the authentication system 120 may wait for a period of time to provide the distributed electronic ledger system 150 time to process and store the content identifier. In some such cases, the authentication system 120 can indicate that the version of the data file is not yet authenticated.

Figure 4:
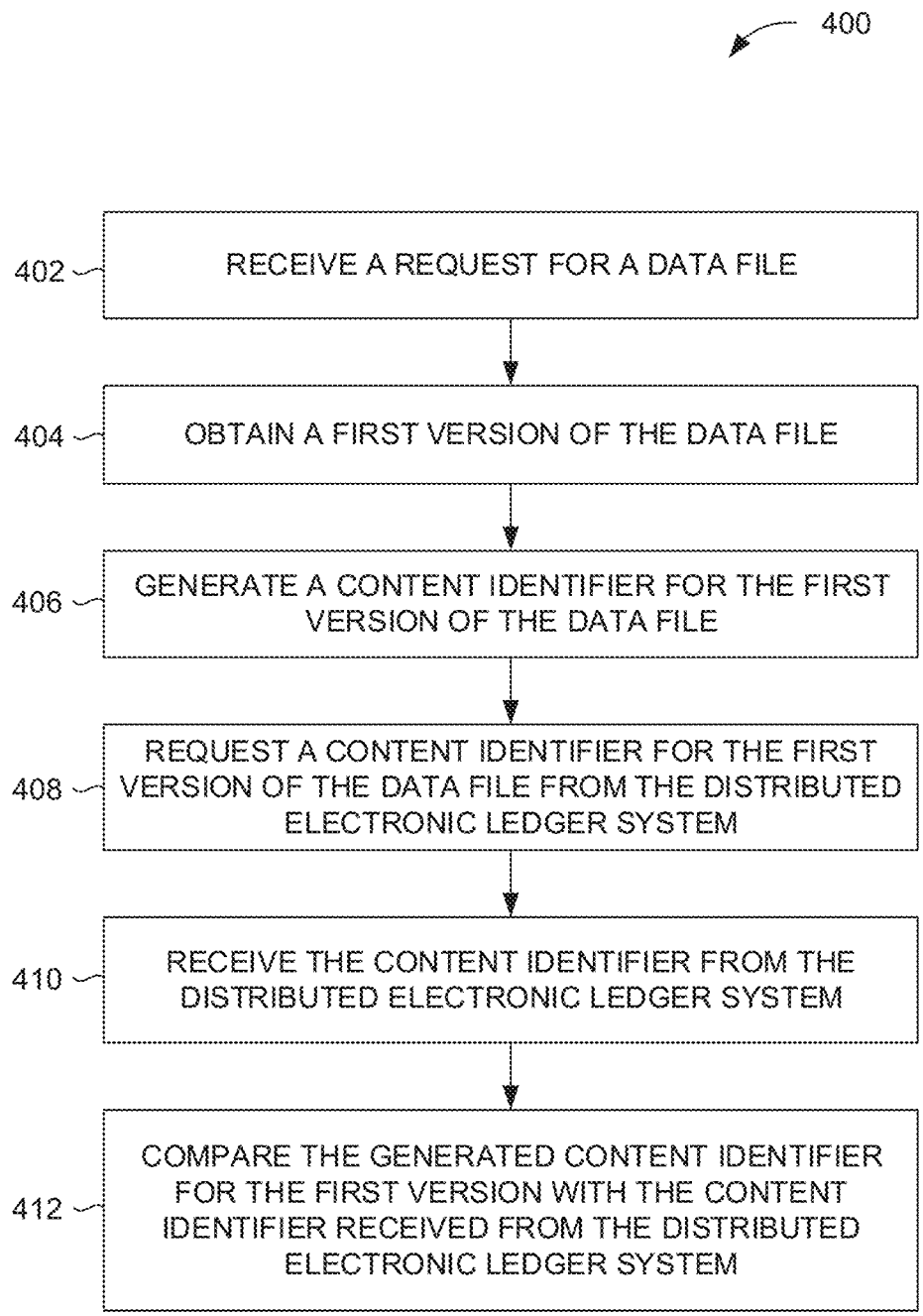
FIG. 4 is a flow diagram illustrative of an embodiment of a routine implemented by the authentication system for authenticating data for use.

FIG. 4 is a flow diagram illustrative of an embodiment of a routine 400 implemented by the authentication system 120 for authenticating data for use. Although described as being implemented by the authentication system 120, it will be understood that one or more elements outlined for routine 400 can be implemented by one or more computing devices/components that are associated with the environment 100, such as, but not limited to, the client computing device 110, the storage system 130, and/or the distributed electronic ledger system 150. Thus, the following illustrative embodiment should not be construed as limiting.

At block 402, the authentication system 120 receives a request for a data file. As described herein, the authentication system 120 can receive the request from a client computing device 110.

At block 404, the authentication system 120 obtains a first version of the data file from the storage system 130. As described, the storage system 130 can store a complete or partial history of the data file. The first version of the data file can vary across embodiments. For example, in some cases, the first version corresponds to the most recent version, the most recently edited version of the data file, or the most recent version saved to the storage system 130. As another example, the first version may be the original version of the data file, or a version of a data file that was last modified on, before, or after a particular date.

At block 406, the authentication system 120 generates a content identifier for the first version of the data file. In certain embodiments, the authentication system 120 generates a content identifier using a hash function, fingerprint function, lossy compression algorithm, tokenization function, or other algorithm that can generate a unique identifier based on the first version of the data file.

In some embodiments, the content identifier can correspond to a hash, fingerprint, checksum, lossy compression output, token, or other identifier, and/or uniquely identifies the content of the first version of the data file from the content of other versions of the data file. In some cases, the authentication system 120 generates a content identifier by generating a hash of data associated with the first version of the data file or the entire contents of the first version of the data file.

At block 408, the authentication system 120 requests a content identifier for the first version of the data file from the distributed electronic ledger system 150 (sometimes referred to as blockchain content identifier). In some cases, to request the blockchain content identifier, the authentication system 120 communicates retrieval information to the distributed electronic ledger system 150. For example, the communication of the retrieval information to the distributed electronic ledger system 150 can operate as a request for the blockchain content identifier. As described herein, the retrieval information can be used by the distributed electronic ledger system 150 to retrieve the blockchain content identifier. For example, the retrieval information can include an address or other identifier that can enable the distributed electronic ledger system 150 to locate and retrieve the blockchain content identifier or a block entry containing the blockchain content identifier.

At block 410, the authentication system 120 receives the blockchain content identifier from the distributed electronic ledger system 150.

At block 412, the authentication system 120 compares the authentication content identifier with the blockchain content identifier. As described herein, in some cases, if the authentication content identifier matches the blockchain content identifier, then the authentication system 120 can authenticate the first version of the data file, since the storage system 130 and the distributed electronic ledger system 150 agree on the contents of the first version of the data file. As such, if the authentication content identifier matches the blockchain content identifier, the authentication system 120 can communicate a copy of the first version of the data file to the client computing device.

In contrast, if the authentication content identifier does not match the blockchain content identifier, the authentication system 120 may not authenticate the first version of the data file. For example, a difference between authentication content identifier and the blockchain content identifier can indicate a discrepancy between the data stored in the storage system 130 and the distributed electronic ledger system 150. As such, if the authentication content identifier does not match blockchain content identifier, the authentication system 120 can communicate an indication of an error. For example, the authentication system 120 can return an error message and/or HTTP bad request status code. In some cases, the authentication system 120 may still provide the first version of the data file to the client computing device. However, in some cases, an unauthenticated data file may require further review.

It will be understood that fewer, more, or different blocks can be used as part of the routine 400. For example, in some cases, the authentication system 120 may perform a pre-validation or temporary validation of the data file by comparing the authentication content identifier with a content identifier stored by the storage system 130. As another example, to receive the blockchain content identifier from the distributed electronic ledger system 150, the authentication system 120 may need to provide the distributed electronic ledger system 150 with retrieval information indicating where on the distributed electronic ledger system 150 to find the blockchain content identifier. Accordingly, in some cases, the authentication system 120 may obtain retrieval information for the first version of the data file from the storage system 130 and communicate that retrieval information to the distributed electronic ledger system 150.

As another example, as described herein, the authentication system 120 may obtain one or more other versions of the data file from the storage system 130, generate authentication content identifiers for those other versions, request the blockchain content identifiers for those other versions, and compare those authentication content identifiers and blockchain content identifiers. In some cases, such a practice may allow the authentication system 120 to authenticate some or all of the versions of the data file each time a data file is requested.

In some cases, one or more blocks can be omitted. For example, in some embodiments, instead of generating its own content identifier, the authentication system 120 can obtain a content identifier for the first version of the data file from the storage system 130, and can use the content identifier from the storage system 130 to authenticate the first version of the data file. In some such cases, the authentication of the first version using the content identifier stored in the storage system 130 can be a preliminary or temporary authentication, and the authentication system 120 can perform a full authentication using the blockchain content identifier following or after the preliminary authentication. In some embodiments, the blocks of routine 400 can be combined with any one or any combination of blocks described herein with reference to at least FIG. 3, 5, or 6.

Saving a Version of a Data File

As described herein, the environment 100 can utilize an authentication system 120 along with distributed electronic ledger system 150 to realize advantages associated with a distributed ledger, while also retaining a running history of data file versions and performing authentications, which can further improve traceability, discrepancy resolution, etc.

The environment 100 includes a storage system 130 that stores a running history of data file versions, as well as retrieval information that can be used be to retrieve associated ledger entries from a distributed electronic ledger system 150. When a client computing device 110 requests to store a data file, an authentication system 120 performs an authentication process as part of storing the data file.

During the authentication process, the authentication system 120 retrieves at least the most recent version of the data file, generates a first content identifier for the retrieved version (or retrieves a blockchain content identifier for the retrieved version), generates a second content identifier for the version submitted by the client computing device for storage, and compares the first and second content identifiers to determine whether to authenticate the version of the data file for storage. If the first and second content identifiers match, then the client computing device has made no changes to the data file since the most recent revision. In contrast, if the first and second content identifiers are different, then the client computing device has made changes to the data file since the most recent revision, and the authentication system 120 can authenticate and store the new version of the data file. In particular, at least to improve security, the authentication system 120 can store a copy of the new version in a storage system 130 and can store the second content identifier in a distributed electronic ledger system 150.

Figure 5:
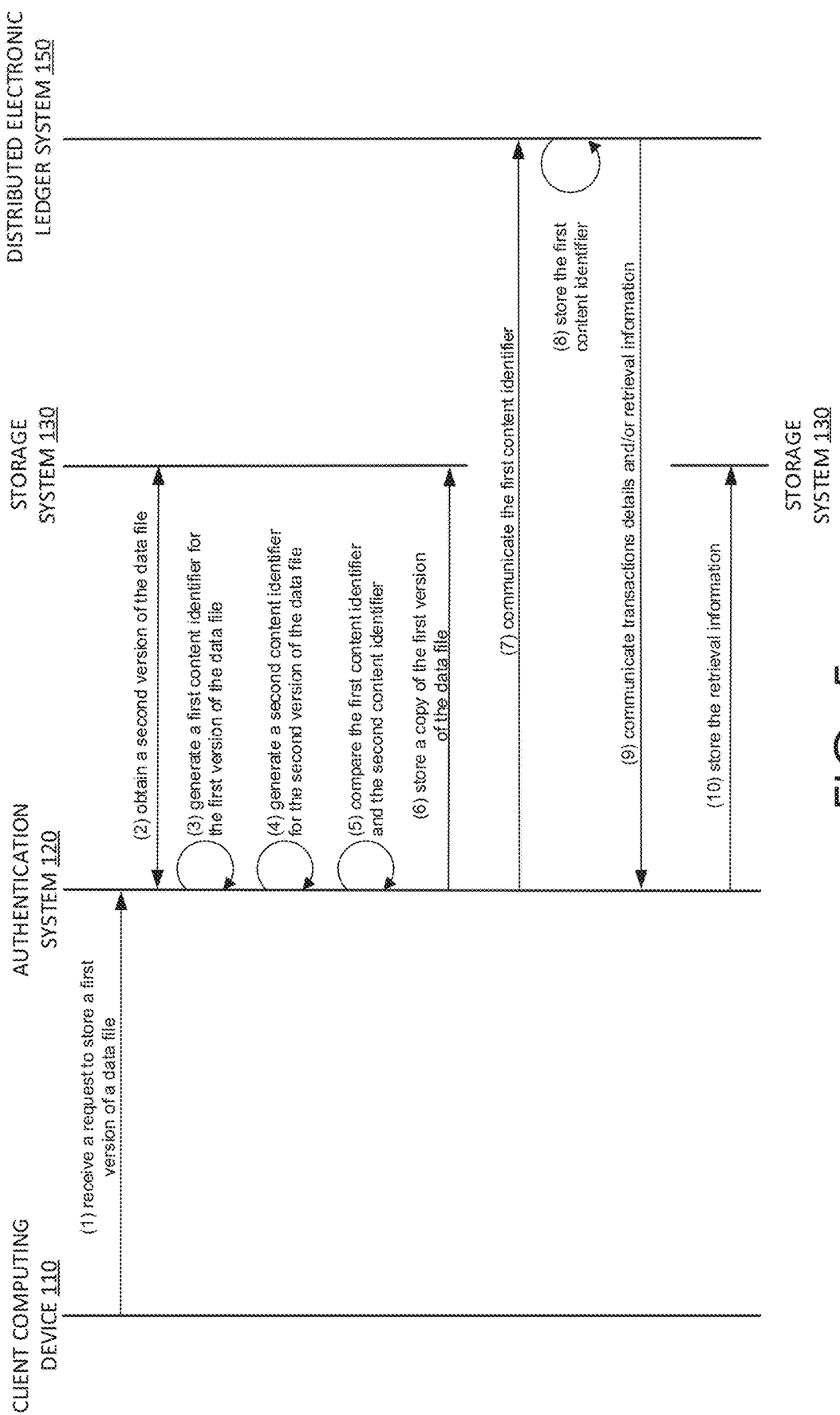
FIG. 5 is a data flow diagram illustrating an embodiment of data flow and communications for storing data.

FIG. 5 is a data flow diagram illustrating an embodiment of data flow and communications for storing data. The data flow diagram of FIG. 5 illustrates an example of data flow and communications between the client computing device 110, the authentication system 120, the storage system 130, and/or the distributed electronic ledger system 150. However, it will be understood, that in some of embodiments, one or more of the functions described herein with respect to FIG. 5 can be omitted, performed concurrently, or in a different order and/or performed by a different component of the environment 100. Accordingly, the illustrated embodiment and description should not be construed as limiting.

At (1), the authentication system 120 receives a request to store or save a data file from a client computing device 110. The client computing device 110 may request to store data file using various techniques. In some cases, the request to store the data file can occur in response to user input. For example, in some cases, the request to store the data file can result from the user attempting to save the data file (e.g., by clicking the "save" button or an equivalent) or close the data file. In some cases, the request to store the data file can occur automatically. For example, a periodic request can be initiated by the client computing device 110 at specific time intervals. As another example, the client computing device 110 may communicate the request responsive to a particular event, such as an expiration of a timing threshold that corresponds to a duration of time that the data file has been open.

In some cases, the request to store the data file comprises a copy of or link to the data file. As described herein, the data file provided by the client computing device 110 may be an edited or modified version of a previous version of the data file. For example, in some cases, the data flow and communications of FIG. 5 occur after the data flow and communications of FIG. 3, such that the authentication system 120 has already provided the client computing device with an authenticated version (e.g., latest version) of the data file.

In some cases, the data file that the client computing device 110 is attempting to store is given a temporary version identifier, since authentication system 120 may ultimately determine not to store the data file (e.g., because the data file does not include any modifications from the previous version). For purposes of this example, and for ease of reference, the data file that the client computing device is attempting to store is generally referred to as the first version of the data file. In some cases, the first version is a current version of the data file that has not yet been saved to the storage system 130.

At (2), the authentication system 120 obtains a second version of the data file from the storage system 130. As described, the storage system 130 can store a complete or partial history of the data file, including any and all versions of the data file. The second version of the data file can vary across embodiments. For example, in some cases, the second version corresponds to the most recent version or the most recently edited version of the data file. In some cases, the second version is the version immediately preceding the first version. As another example, the second version may be the original version of the data file, or a version of a data file that was last modified on, before, or after a particular date. In some cases, such as where the user is requesting to save a version of a data file that was recently retrieved for them, the second version corresponds to the version of the data file that was provided to the client computing device at interaction (8) of FIG. 3. In some cases, to obtain the second version of the data file, the authentication system 120 identifies the second version of the data file. For example, the authentication system 120 may select the second version from the other versions stored in the shared storage. As described, the second version can be the most recently modified version, the original version, etc.

At (3) and (4), in the manner similar to that described with respect to interaction (3) of FIG. 3 for generating an authentication content identifier, the authentication system 120 generates a first content identifier for the first version of the data file and a second content identifier for the second version of the data file. In some cases, rather than, or in addition to, generating the second content identifier for the second version, the authentication system 120 may retrieve the second content identifier for the second version. For example, in some cases, the authentication system 120 retrieves the second content identifier from the storage system 130. As another example, in some cases, the authentication system 120 retrieves the second content identifier from the distributed electronic ledger system 150, such as from a queue of the distributed electronic ledger system 150 or from the distributed ledger.

At (5), the authentication system 120 compares the first content identifier with the second content identifier. As described herein, a content identifier can uniquely identify a data file. Thus, by comparing the first and second content identifiers, the authentication system 120 can determine whether the first version is different from the second version so as to justify saving a new version to the storage system 130 and/or the distributed electronic ledger system 150. In certain embodiments, if the first and second content identifiers match, the authentication system 120 can determine that the client computing device 110 is attempting to re-save the second version without making any modifications to the second version. In some such cases, the authentication system 120 can determine not to save the first version. As such, if the content identifiers match, the client computing device 110 may not perform the subsequent interactions of FIG. 5. In contrast, if the content identifiers do not match, the authentication system 120 can determine that the first version of the data file includes modification that should or can be saved, and as a result can proceed to interaction (6) or (7).

At (6), the authentication system 120 stores a copy of the first version of the data file in the storage system 130. In some cases, the authentication system 120 may also store the first content identifier in the storage system 130 and/or may associate the first version of the data file with the first content identifier.

At (7), the authentication system 120 communicates the first content identifier the distributed electronic ledger system 150. As described herein, the authentication system 120 can communicate the first content identifier to the distributed electronic ledger system 150 in a variety of ways, such as, but not limited to, as part of a block entry, with a group of content identifiers or block entries, with additional information, etc.

In certain embodiments, the authentication system 120 can sign the block entries that it communicates to the distributed electronic ledger system 150. For example, the authentication system 120 can generate a hash of a block entry, encrypt the generated hash using a private key of a key pair, and send the encrypted hash along with the block entry to the distributed electronic ledger system 150. In turn, the distributed electronic ledger system 150 can generate a hash of the block entry received from the authentication system 120 (minus the encrypted hash), decrypt the encrypted hash using a public key of the same key pair, and compare the decrypted hash with the hash it generated from the block entry. Based on a match of the two hashes, the distributed electronic ledger system 150 can confirm that the block entry came from the authentication system 120 and has not been altered or modified.

In certain embodiments, the authentication system 120 communicates the first content identifier with additional information associated with the first version of the data file as part of a block entry. As described herein, the additional information can include, but is not limited to, version, ID, type, created date, status, location, last updated, last updated by ID, name, batch identifier, strain identifier, other attributes, Nonce, or other metadata, etc.

In certain embodiments, the authentication system 120 and/or the distributed electronic ledger system 150 can use one or more processing buffers or queues to temporarily maintain data (e.g., block entries, content identifiers, and/or other information) communicated between the authentication system 120 and the distributed electronic ledger system 150. For example, the authentication system 120 may include a queue for the data to be transmitted to the distributed electronic ledger system 150. In certain cases, the authentication system 120 can include a queue for each data file or multiple data files can share the same queue. As a particular version is saved in distributed electronic ledger system 150, the authentication system 120 can communicate the next version of the data file in the queue. However, if additional versions are received before a preceding version is saved, the queue can temporarily maintain the subsequent versions until the preceding version is stored by the distributed electronic ledger system 150. In some cases, the queue may maintain data in the sequence provided by the authentication system 120. For example, the queue may be a first-in-first-out (FIFO) data structure such that the authentication system 120 will communicate data from the queue in the same order as it received into the queue. In this way, the authentication system 120 knows the anticipated order of the ledger entries, even if that data still resides in the queue.

As a non-limiting example, consider a scenario in which four block versions of a data file (Versions A, B, C, and D) are created before the content identifier for Version A is stored in the distributed electronic ledger system 150. In this example, the authentication system 120 can use a queue to store the content identifiers for the different versions until the content identifiers of the preceding versions are saved to the distributed electronic ledger system 150. For example, the authentication system 120 may communicate the content identifier for Version A to the distributed electronic ledger system 150, while maintaining Versions B, C, and D in the queue. Once the content identifier of Version A is saved by the distributed electronic ledger system 150, the authentication system 120 may communicate the next content identifier from the queue (content identifier for Version B). The authentication system 120 can continue this process until all content identifiers from the queue have been processed. Furthermore, the authentication system 120 can continue to add content identifiers for different data file versions to the queue over time. For example, while the distributed electronic ledger system 150 is processing the content identifier for Version C, the authentication system 120 might add the content identifiers for Versions E and/or F to the queue.

At (8), the distributed electronic ledger system 150 stores the first content identifier. For example, the distributed electronic ledger system 150 can use the information received from the authentication system 120 to form one or more blocks. In some cases, each block entry in a block can correspond to a version of data file, multiple versions of a data file, multiple data files, etc. The block entries of a block can include the information received from the authentication system 120. For example, a block entry can include one or more of a content identifier, version, ID, type, created date, status, location, last updated, last updated by ID, name, batch identifier, strain identifier, other attributes, Nonce, or other metadata, etc. corresponding to the information received from the authentication system 120.

In some cases, the distributed electronic ledger system 150 can encrypt the content of blocks or block entries. For example, entries of a block can be encrypted individually or together. In this way, the distributed electronic ledger system 150 can increase the security of the block contents. In some embodiments, the distributed electronic ledger system 150 can encrypt the entries using a public key of a key pair associated with the authentication system 120 (or the authentication system 120 can encrypt the content of a particular block entry before communicating it to the distributed electronic ledger system 150).

As described herein, the distributed electronic ledger system 150 can generate one or more blocks for one or more blockchains based on the received information. In some cases, the distributed electronic ledger system 150 forms blocks based on data received chronologically. For example, the distributed electronic ledger system 150 can generate a block at predetermined time intervals, based on an amount or size of data received, and/or based on a number of block entries. In certain embodiments, the distributed electronic ledger system 150 forms blocks based on a relationship between block entries or data files.

As part of generating a block, the distributed electronic ledger system 150 can generate a content identifier based on the body or block entries of a block. The distributed electronic ledger system 150 can store the content identifier associated with the body of the block in a header portion of the block. Furthermore, the distributed electronic ledger system 150 can relate blocks. For example, the distributed electronic ledger system 150 can store a content identifier associated with a block or the body of a block in a header portion of a subsequent block, or use a block identifier of a previous block to generate a block identifier for a subsequent block.

In some embodiments, the distributed electronic ledger system 150 utilizes ledger entries that are adapted to have various linkages to one another such that the integrity of the ledger entries can be reinforced and/or validated. For example, the linkages may include hashes computed based on prior entries in the ledger, which may be utilized to determine whether a ledger entry is a fraudulent entry by reviewing the correctness of the hash based on performing the hash on information stored on prior entries. For example, a block corresponding to version 4 may include a hash of the content identifier of version 4 and the content identifier of version 3. In this way, the linkages between immediately proximate versions can be reinforced.

At (9), distributed electronic ledger system 150 communicates transaction details and/or retrieval information to the authentication system 120. As described herein, the transaction details and/or retrieval information can be associated with the storage of content identifiers and/or block entries in the distributed electronic ledger system 150. For example, the retrieval information can be used by the distributed electronic ledger system 150 to retrieve the content identifier and/or block entry. In some cases, the retrieval information can include an address or other identifier that can be sent to the distributed electronic ledger system 150 and enable the distributed electronic ledger system 150 to locate and retrieve a block entry or content identifier and return it to the authentication system 120. For example, the retrieval information can include a location of the content identifier and/or block entry on the blockchain, a transaction identifier, a block identifier, etc. In some cases, once the distributed electronic ledger system 150 stores the block entry or group of block entries, it can communicate retrieval information to the authentication system 120 for storage, for example in the storage system 130.

At (10), the authentication system 120 stores the retrieval information in the storage system 130. By storing the retrieval information in the storage system 130, the storage system 130 can facilitate efficient retrieval of the data stored in the distributed electronic ledger system 150.

It will be understood that the steps described herein can be changed, re-ordered, or omitted. In addition, in certain cases, one or more additional steps can be added. For example, interactions (3) and (4), (6) and (7), and/or (8) and (9) can occur concurrently. In addition, the various steps can be repeated each time the authentication system 120 receives a request to store a version of a data file. In some cases, the authentication system 120 may allow multiple users to create different versions during an overlapping period of time. For example, consider a scenario in which multiple different users have each opened and edited a second version of a data file. In some cases, the authentication system 120 may allow only one of the users to save its edits as a new version (i.e., a third version), while preventing the other user from saving its edits as the third version. For example, in some cases, the user that first attempts to save the third version is provided that opportunity, while any later attempts to save the third version are prohibited. In some such cases, upon the first user saving the version, the second user may be prompted to update the data file to show the new version created based on the changes by the first user. As another example, the authentication system 120 may not allow the second user to edit, or ignore edits by the second user that affect, the portions of the data file edited by the first user. As yet another example, one of the users may be associated with a higher priority than the other user, and the higher priority user is given preference.

Referring back to the scenario in which multiple different users have each opened and edited a second version of a data file, in some cases, the authentication system 120 may allow each of the users to save their edits as a new version. For example, a user that first attempts to save the its edits may be permitted to save a third version, while a later attempt to save might result in a fourth version. In some such cases, the third version and fourth version may be merged (e.g., into the fourth version or a fifth version).

For example, as described herein, different entities may modify different portions of the data file such that a merger of the third and fourth versions does not result in an overwrite of any of the modifications presented in the third or fourth versions. In some such cases, for a data file that a particular user has requested to be saved, the authentication system 120 can generate a content identifier for the portion of the data file that is editable by the particular user. The generated content identifier can be compared with a stored content identifier for the same portion from a previous version of the data file (retrieved from the distributed electronic ledger system 150 and/or from the storage system 130). If there are changes, the authentication system 120 can update the portion of the data file that is editable by the particular user and save the updated data file as a new version.

Alternatively, in some cases, the allowance of the third and fourth versions result in a validation failure. For example, when such a situation occurs, the authentication system 120 may communicate an error message to one or more of the users and/or can require manual review of the third and/or fourth versions of the data files before any further versions are permitted.

Figure 6:
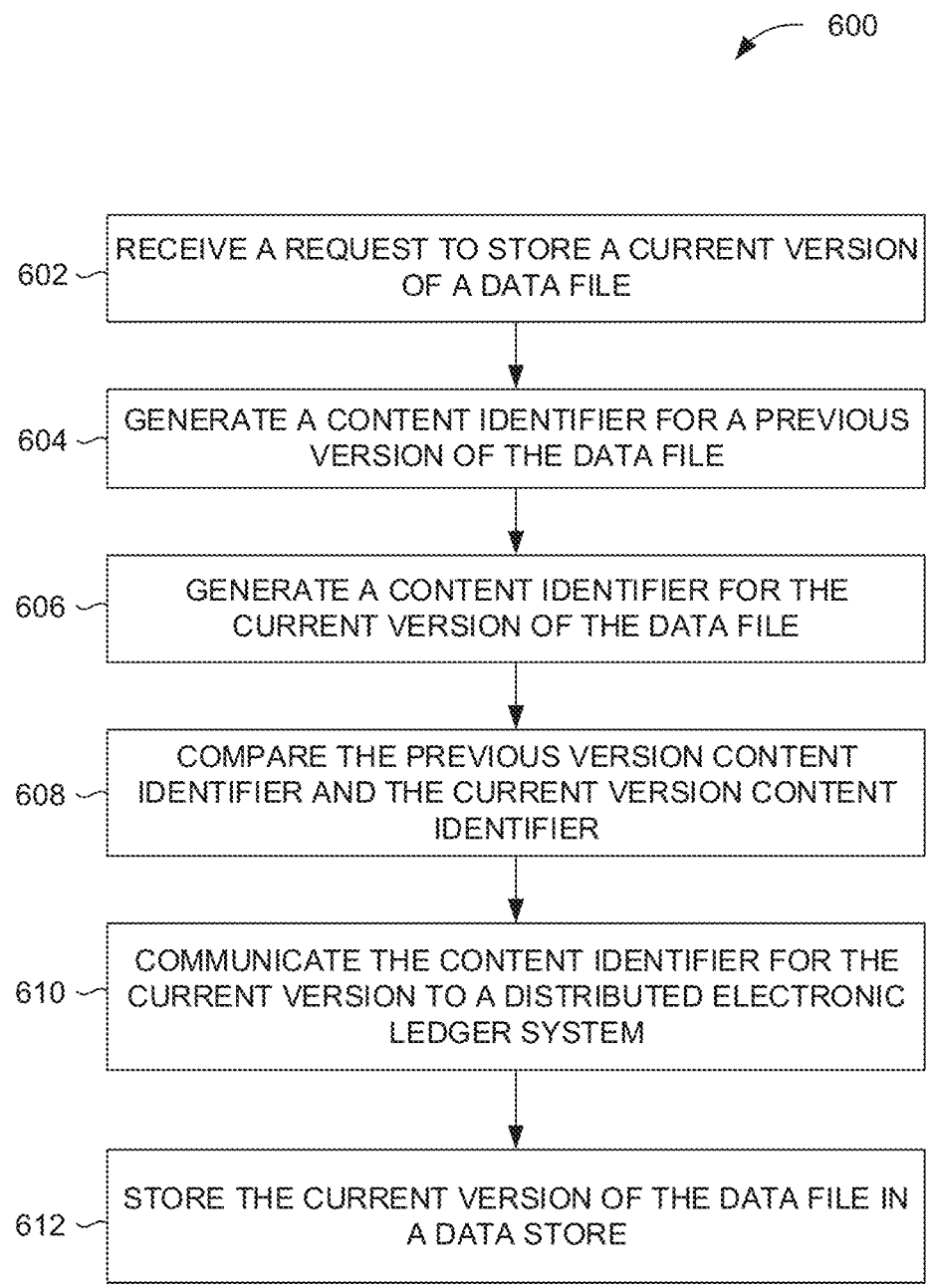
FIG. 6 is a flow diagram illustrative of an embodiment of a routine implemented by the authentication system for storing a data file in a storage system.

FIG. 6 is a flow diagram illustrative of an embodiment of a routine 600 implemented by the authentication system 120 for storing a data file in a storage system 130. Although described as being implemented by the authentication system 120, it will be understood that one or more elements outlined for routine 600 can be implemented by one or more computing devices/components that are associated with the environment 100, such as, but not limited to, the client computing device 110, the storage system 130, the distributed electronic ledger system 150. Thus, the following illustrative embodiment should not be construed as limiting.

At block 602, the authentication system 120 receives a request to store a data file. As described herein, the authentication system 120 can receive the request from a client computing device 110. For purposes of this example, and for ease of reference, the data file that the client computing device is attempting to store is generally referred to as the current version of the data file.

At block 604, similar to block 406 of FIG. 4, the authentication system 120 generates a content identifier for a previous version of the data file (also referred to herein as a previous version content identifier). In some cases, similar to block 404 of FIG. 4, the authentication system 120 can obtain the previous version of the data file from the storage system 130.

At block 606, the authentication system 120 generates a content identifier for the current version of the data file (also referred to herein as a current version content identifier).

At block 608, the authentication system 120 compares the previous version content identifier with the current version content identifier. As described herein, if the previous version and the current version content identifiers match, the authentication system 120 can determine that the client computing device 110 is attempting to re-save the previous version without making any modifications. In some such cases, the authentication system 120 can determine not to save the current version. In contrast, if the content identifiers do not match, the authentication system 120 can determine that the current version of the data file includes modification that should or can be saved, and as a result can proceed to blocks 610 and 612. As described herein, in some cases, the authentication system 120 can compare content identifiers for different portions of the data file to determine if changes have been made or a new version should be created.

At block 610, the authentication system 120 communicates the current version content identifier to the distributed electronic ledger system 150. As described herein, the authentication system 120 can communicate the current version content identifier to the distributed electronic ledger system 150 in a variety of ways, such as, but not limited to, as part of a block entry, with a group of content identifiers or block entries, with additional information, etc. In response, the distributed electronic ledger system 150 can store the current version content identifier. As described herein, the authentication system 120 can communicate the current version content identifier to the distributed electronic ledger system using a queue.

At block 612, the authentication system 120 stores a copy of the current version of the data file in the storage system 130. In some cases, the authentication system 120 may also store the current version content identifier in the storage system 130 and/or may associate the current version of the data file with the current version content identifier.

It will be understood that fewer, more, or different blocks can be used as part of the routine 400. For example, in some cases, the authentication system 120 receive retrieval information from the distributed electronic ledger system 150 and/or can store the retrieval information in the storage system 130. In some cases, the authentication system 120 may not allow previous versions of a data file to be overwritten. In some such cases, each time a user "saves" a data file (e.g., by clicking save or closing the data file), the authentication system 120 can save a new version of the data file. In certain cases, the authentication system 120 can save an entire copy of the new version of the data file. In some cases, the authentication system 120 can save a de-duplicated version of the new version the data file. In some cases, the authentication system 120 can track versions of different portions of the data file and save content identifiers for the different portions of the data file.

In some cases, one or more blocks can be omitted. In some embodiments, the blocks of routine 600 can be combined with any one or any combination of blocks described herein with reference to at least FIGS. 3-5. In some cases, routine 600 can follow routine 400 (or vice versa). For example, when a user accessed the data file, the authentication system 120 may have authenticated the previous version prior to making it available for modification as the current version. As another example, once the current version is saved as part of routine 600, it can later be retrieved as a "previous version" for modification as part of routine 400.

Example Embodiments

Various example embodiments of methods, systems and non-transitory computer-readable medium relating to data integrity:

Clause 1. A method of authenticating a data file for use, the method comprising:

receiving a request for a data file from a client computing device;

obtaining a first version of the data file and retrieval information, wherein the retrieval information comprises information indicative of a location on a distributed electronic ledger system of a blockchain content identifier for the first version of the data file;

generating an authentication content identifier for the first version of the data file;

obtaining the blockchain content identifier for the first version of the data file based at least in part on the retrieval information;

comparing the authentication content identifier for the first version of the data file with the blockchain content identifier for the first version of the data file; and based at least in part on a determination that the authentication content identifier for the first version of the data file matches the blockchain content identifier for the first version of the data file, providing the first version of the data file to the client computing device.

Clause 2. The method of clause 1, wherein the request for the data file includes a version identifier indicating the first version of the data file.

Clause 3. The method of any of the previous clauses, wherein the request for the data file does not include a version identifier indicating the first version of the data file.

Clause 4. The method of any of the previous clauses, further comprising, identifying the first version of the data file based on a most recently saved version of the data file in a storage system.

Clause 5. The method of any of the previous clauses, wherein said obtaining the first version of the data file and the retrieval information comprising obtaining the first version of the data file and the retrieval information from a storage system.

Clause 6. The method of any of the previous clauses, wherein the blockchain content identifier is a first blockchain content identifier, wherein the authentication content identifier is a first authentication content identifier, wherein the retrieval information is first retrieval information, the method further comprising:

obtaining a second version of the data file and second retrieval information, wherein the second retrieval information comprises information indicative of a location on the distributed electronic ledger system of a second blockchain content identifier for the first version of the data file;

generating a second authentication content identifier for the second version of the data file;

obtaining the second blockchain content identifier based at least in part on the second retrieval information; and comparing the second authentication content identifier with the second blockchain content identifier;

wherein said providing the first version of the data file to the client computing device is further based at least in part on a determination that the second authentication content identifier matches the second blockchain content identifier.

Clause 7. The method of clause 6, wherein the second version of the data file is a version prior to the first version of the data file.

Clause 8. The method of any of clauses 6 or 7, wherein the second authentication content identifier comprises a hash of content of the second version of the data file.

Clause 9. The method of any of clauses 6-8, wherein the first authentication content identifier comprises a hash of each of the second authentication content identifier and content of the first version of the data file.

Clause 10. The method of any of clauses 6-9, wherein the second authentication content identifier comprises a hash of each of a third authentication content identifier and content of the second version of the data file, wherein the third authentication content identifier corresponds to a third version of the data file that is an earlier version than the second version of the data file.

Clause 11. The method of any of the previous clauses, wherein said obtaining the blockchain content identifier for the first version of the data file comprises communicating at least a portion of the retrieval information to the distributed electronic ledger system.

Clause 12. The method of clause 11, wherein said obtaining the blockchain content identifier for the first version of the data file comprises receiving the blockchain content identifier from the distributed electronic ledger system in response to said communicating the at least a portion of the retrieval information.

Clause 13. The method of any of the previous clauses, wherein said obtaining the blockchain content identifier for the first version of the data file comprises obtaining the blockchain content identifier for the first version of the data file from a queue.

Clause 14. The method of any of the previous clauses, further comprising: authenticating one or more other versions of the data file, wherein said providing the first version of the data file to the client computing device is further based at least in part on said authenticating the one or more other versions of the data file.

Clause 15. The method of any of the previous clauses, further comprising: obtaining one or more other versions of the data file from storage system, wherein the one or more other versions of the data file are earlier versions than the first version of the data file; and authenticating the one or more other versions of the data file, wherein said providing the first version of the data file to the client computing device is further based at least in part on said authenticating the one or more other versions of the data file.

Clause 16. The method of any of the previous clauses, wherein based at least in part on a determination that the authentication content identifier for the first version of the data file does not match the blockchain content identifier for the first version of the data file, communicating an indication of an error to the client computing device.

Clause 17. A system for authenticating a data file for use, the system comprising:

one or more processors configured to:

receive a request for a data file from a client computing device;

obtain a first version of the data file and retrieval information, wherein the retrieval information comprises information indicative of a location on a distributed electronic ledger system of a blockchain content identifier for the first version of the data file;

generate an authentication content identifier for the first version of the data file;

obtain the blockchain content identifier for the first version of the data file based at least in part on the retrieval information;

compare the authentication content identifier for the first version of the data file with the blockchain content identifier for the first version of the data file; and based at least in part on a determination that the authentication content identifier for the first version of the data file matches the blockchain content identifier for the first version of the data file, provide the first version of the data file to the client computing device.

Clause 18. The system of clause 17, wherein the first version of the data file is a most recently saved version of the data file in a storage system.

Clause 19. The system of any of clauses 17 or 18, wherein to obtain the blockchain content identifier, the one or more processors are configured to communicate at least a portion of the retrieval information to the distributed electronic ledger system.

Clause 20. The system of any of clauses 17-19, wherein the one or more processors are further configured to:

obtain one or more other versions of the data file from storage system, wherein the one or more other versions of the data file are earlier versions than the first version of the data file; and authenticate the one or more other versions of the data file, wherein to provide the first version of the data file to the client computing device, the one or more processors are configured to provide the first version of the data file to the client computing device based at least in part on said a determination that the one or more other versions of the data file are authenticated.

Clause 21. A method for storing a data file in a data store, the method comprising:

receiving, from a client computing device, a request to store a first version of a data file;

generating a first content identifier for the first version of the data file;

identifying another version of the data file as a second version of the data file;

obtaining a second content identifier for the second version of the data file;

comparing the first content identifier with the second content identifier; and based at least in part on a determination that the first content identifier does not match the second content identifier, communicating the first content identifier to a distributed electronic ledger system for storage as at least a portion of a block in the distributed electronic ledger system; and storing the first version of the data file in the storage system.

Clause 22. The method of clause 21, wherein said obtaining the second content identifier comprises:

obtaining the second version of the data file from a storage system; and generating the second content identifier based on the second version of the data file.

Clause 23. The method of any of clauses 21-22, wherein said obtaining the second content identifier comprises obtaining the second content identifier from the storage system.

Clause 24. The method of any of clauses 21-23, wherein said obtaining the second content identifier comprises obtaining the second content identifier from the distributed electronic ledger system.

Clause 25. The method of any of clauses 21-24, wherein said obtaining the second content identifier comprises obtaining the second content identifier from a queue.

Clause 26. The method of any of clauses 21-25, wherein said communicating the first content identifier to a distributed electronic ledger system for storage comprises communicating the first content identifier to a queue.

Clause 27. The method of clause 26, wherein the distributed electronic ledger system obtains content identifiers from the queue and stores the content identifiers in the distributed electronic ledger system.

Clause 28. The method of any of clauses 21-27, further comprising storing the first content identifier in the storage system for later retrieval.

Clause 29. The method of any of clauses 21-28, further comprising receiving an acknowledgement that the distributed electronic ledger system stored the first content identifier, wherein the acknowledgement comprises retrieval information useful for retrieving the first content identifier from the distributed electronic ledger system.

Clause 30. The method of clause 29, further comprising storing the retrieval information in the storage system for later retrieval.

Clause 31. The method of any of clauses 21-30, wherein the first version is a current version of the data file that has not been saved to the storage system.

Clause 32. The method of any of clauses 21-31, wherein the second version is a version immediately preceding the first version.

Clause 33. The method of any of clauses 21-32, wherein based at least in part on a determination that the first content identifier matches the second content identifier, determining not to communicate the first content identifier to the distributed electronic ledger system.

Clause 34. A system for storing a data file in a data store, the system comprising:

one or more processors configured to:

receive, from a client computing device, a request to store a first version of a data file;

generate a first content identifier for the first version of the data file;

identify another version of the data file as a second version of the data file;

obtain a second content identifier for the second version of the data file;

compare the first content identifier with the second content identifier; and based at least in part on a determination that the first content identifier does not match the second content identifier, communicate the first content identifier to a distributed electronic ledger system for storage as at least a portion of a block in the distributed electronic ledger system; and storing the first version of the data file in the storage system.

Clause 35. The system of clause 34, wherein to obtain the second content identifier, the one or more processors are configured to:

obtain the second version of the data file from a storage system; and generate the second content identifier based on the second version of the data file.

Clause 36. The system of any of clauses 34-35, wherein to obtain the second content identifier, the one or more processors are configured to obtain the second content identifier from the storage system.

Clause 37. The system of any of clauses 34-36, wherein to obtain the second content identifier, the one or more processors are configured to obtain the second content identifier from the distributed electronic ledger system.

Clause 38. The system of any of clauses 34-37, wherein to obtain the second content identifier, the one or more processors are configured to obtain the second content identifier from a queue.

Clause 39. The system of any of clauses 34-38, wherein to communicate the first content identifier to the distributed electronic ledger system, the one or more processors are configured to communicate the first content identifier to a queue.

Clause 40. The system of any of clauses 34-39, wherein the one or more processors are configured to receive an acknowledgement that the distributed electronic ledger system stored the first content identifier, wherein the acknowledgement comprises retrieval information useful for retrieving the first content identifier from the distributed electronic ledger system; and store the retrieval information in the storage system for later retrieval.

Clause 41. A system comprising any one or any combination of the authentication system, the storage system, the distributed electronic ledger system, or the logic system as shown in the Figures and/or described herein.

Clause 42. A system comprising any of the components or features illustrated in the Figures and/or described herein.

Clause 43. A method of using the system of any of clauses 34-42.

Clause 44. A computer-readable medium comprises computer executable instructions that when executed by one or more processors cause the one or more processors to perform any of the steps described in any of clauses 1-43.

Terminology

The term "and/or" herein has its broadest least limiting meaning which is the disclosure includes A alone, B alone, both A and B together, or A or B alternatively, but does not require both A and B or require one of A or one of B. As used herein, the phrase "at least one of" A, B, "and" C should be construed to mean a logical A or B or C, using a non-exclusive logical or.

The following description is merely illustrative in nature and is in no way intended to limit the disclosure, its application, or uses. For purposes of clarity, the same reference numbers will be used in the drawings to identify similar elements. It should be understood that steps within a method may be executed in different order without altering the principles of the present disclosure.

Features, materials, characteristics, or groups described in conjunction with a particular aspect, embodiment, or example are to be understood to be applicable to any other aspect, embodiment or example described herein unless incompatible therewith. All of the features disclosed in this specification (including any accompanying claims, abstract and drawings), or all of the steps of any method or process so disclosed, may be combined in any combination, except combinations where at least some of such features or steps are mutually exclusive. The protection is not restricted to the details of any foregoing embodiments. The protection extends to any novel one, or any novel combination, of the features disclosed in this specification (including any accompanying claims, abstract and drawings), or to any novel one, or any novel combination, of the steps of any method or process so disclosed.

While certain embodiments have been described, these embodiments have been presented by way of example only, and are not intended to limit the scope of protection. Indeed, the novel methods and systems described herein may be embodied in a variety of other forms. Furthermore, various omissions, substitutions and changes in the form of the methods and systems described herein may be made. Those skilled in the art will appreciate that in some embodiments, the actual steps taken in the processes illustrated or disclosed may differ from those shown in the figures. Depending on the embodiment, certain of the steps described above may be removed, others may be added. For example, the actual steps or order of steps taken in the disclosed processes may differ from those shown in the figures. Depending on the embodiment, certain of the steps described above may be removed, others may be added. For instance, the various components illustrated in the figures may be implemented as software or firmware on a processor, controller, ASIC, FPGA, or dedicated hardware. Hardware components, such as processors, ASICs, FPGAs, and the like, can include logic circuitry. Furthermore, the features and attributes of the specific embodiments disclosed above may be combined in different ways to form additional embodiments, all of which fall within the scope of the present disclosure.

Although the present disclosure includes certain embodiments, examples and applications, it will be understood by those skilled in the art that the present disclosure extends beyond the specifically disclosed embodiments to other alternative embodiments or uses and obvious modifications and equivalents thereof, including embodiments which do not provide all of the features and advantages set forth herein. Accordingly, the scope of the present disclosure is not intended to be limited by the specific disclosures of preferred embodiments herein, and may be defined by claims as presented herein or as presented in the future.

Conditional language, such as "can," "could," "might," or "may," unless specifically stated otherwise, or otherwise understood within the context as used, is generally intended to convey that certain embodiments include, while other embodiments do not include, certain features, elements, or steps. Thus, such conditional language is not generally intended to imply that features, elements, or steps are in any way required for one or more embodiments or that one or more embodiments necessarily include logic for deciding, with or without user input or prompting, whether these features, elements, or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list. Further, the term "each," as used herein, in addition to having its ordinary meaning, can mean any subset of a set of elements to which the term "each" is applied.

Conjunctive language such as the phrase "at least one of X, Y, and Z," unless specifically stated otherwise, is otherwise understood with the context as used in general to convey that an item, term, etc. may be either X, Y, or Z. Thus, such conjunctive language is not generally intended to imply that certain embodiments require the presence of at least one of X, at least one of Y, and at least one of Z.

Language of degree used herein, such as the terms "approximately," "about," "generally," and "substantially" as used herein represent a value, amount, or characteristic close to the stated value, amount, or characteristic that still performs a desired function or achieves a desired result. For example, the terms "approximately", "about", "generally," and "substantially" may refer to an amount that is within less than 10% of, within less than 5% of, within less than 1% of, within less than 0.1% of, and within less than 0.01% of the stated amount. As another example, in certain embodiments, the terms "generally parallel" and "substantially parallel" refer to a value, amount, or characteristic that departs from exactly parallel by less than or equal to 15 degrees, 10 degrees, 5 degrees, 3 degrees, 1 degree, or 0.1 degree.

The scope of the present disclosure is not intended to be limited by the specific disclosures of preferred embodiments in this section or elsewhere in this specification, and may be defined by claims as presented in this section or elsewhere in this specification or as presented in the future. The language of the claims is to be interpreted broadly based on the language employed in the claims and not limited to the examples described in the present specification or during the prosecution of the application, which examples are to be construed as non-exclusive.

What is claimed is:

1. A method for storing a data file in a data storage system, the method comprising:
  receiving, from a client computing device, a user request to store a user modified version of a data file in the data storage system, wherein the user modified version of the data file is modified using the client computing device; and
  responsive to the user request to store the user modified version of the data file in the data storage system:
    generating, by the data storage system, a first content identifier from the user modified version of the data file;
    identifying another version of the data file stored in the data storage system as an earlier version of the data file;
    obtaining, by the data storage system, a second content identifier of the earlier version of the data file;
    comparing, by the data storage system, the first content identifier of the user modified version of the data file with the second content identifier of the earlier version of the data file; and
    responsive to a determination that the first content identifier of the user modified version of the data file does not match the second content identifier of the earlier version of the data file:
      communicating, by the data storage system, the first content identifier of the user modified version of the data file to a distributed electronic ledger system for storage as at least a portion of a block in the distributed electronic ledger system, and
      storing the user modified version of the data file in the data storage system, wherein the earlier version of the data file is also stored in the data storage system.

2. The method of claim 1, wherein said obtaining the second content identifier comprises:
  obtaining the earlier version of the data file from the data storage system; and
  generating the second content identifier based on the earlier version of the data file.

3. The method of claim 1, wherein said obtaining the second content identifier comprises obtaining the second content identifier from the data storage system.

4. The method of claim 1, wherein said obtaining the second content identifier comprises obtaining the second content identifier from the distributed electronic ledger system.

5. The method of claim 1, wherein said obtaining the second content identifier comprises obtaining the second content identifier from a queue.

6. The method of claim 1, wherein said communicating the first content identifier to a distributed electronic ledger system for storage comprises communicating the first content identifier to a queue.

7. The method of claim 6, wherein the distributed electronic ledger system obtains content identifiers from the queue and stores the content identifiers in the distributed electronic ledger system.

8. The method of claim 1, further comprising storing the first content identifier in the data storage system for later retrieval.

9. The method of claim 1, further comprising receiving an acknowledgement that the distributed electronic ledger system stored the first content identifier, wherein the acknowledgement comprises retrieval information useful for retrieving the first content identifier from the distributed electronic ledger system.

10. The method of claim 9, further comprising storing the retrieval information in the data storage system for later retrieval.

11. The method of claim 1, wherein the user modified version is a current version of the data file that has not been saved to the data storage system.

12. The method of claim 1, wherein the earlier version is a version immediately preceding the modified version.

13. The method of claim 1, wherein based at least in part on a determination that the first content identifier matches the second content identifier, determining not to communicate the first content identifier to the distributed electronic ledger system.

14. A computing system for storing a data file in a data storage system, the computing system comprising:
  one or more processors configured to:
    receive, from a client computing device, a request to store a user modified version of a data file in the data storage system; and
    responsive to the request to store the user modified version of the data file in the data storage system:
      generate a first content identifier from the user modified version of the data file;
      identify another version of the data file stored in the data storage system as an earlier version of the data file;
      obtain a second content identifier of the earlier version of the data file corresponding to the earlier version of the data file;
      compare the first content identifier of the user modified version of the data file with the second content identifier of the earlier version of the data file; and
      responsive to a determination that the first content identifier of the user modified version of the data file does not match the second content identifier of the earlier version of the data file:
        communicate the first content identifier of the user modified version of the data file to a distributed electronic ledger system for storage as at least a portion of a block in the distributed electronic ledger system, and
        storing the user modified version of the data file in the data storage system,
      wherein the earlier version of the data file is also stored in the data storage system.

15. The computing system of claim 14, wherein to obtain the second content identifier of the earlier version of the data file, the one or more processors are configured to:
  obtain the earlier version of the data file from the data storage system; and
  generate the second content identifier based on the earlier version of the data file.

16. The computing system of claim 14, wherein to obtain the second content identifier, the one or more processors are configured to obtain the second content identifier from the data storage system.

17. The computing system of claim 14, wherein to obtain the second content identifier, the one or more processors are configured to obtain the second content identifier from the distributed electronic ledger system.

18. The computing system of claim 14, wherein to obtain the second content identifier, the one or more processors are configured to obtain the second content identifier from a queue.

19. The computing system of claim 14, wherein to communicate the first content identifier to the distributed electronic ledger system, the one or more processors are configured to communicate the first content identifier to a queue.

20. The computing system of claim 14, wherein the one or more processors are configured to:
  receive an acknowledgement that the distributed electronic ledger system stored the first content identifier, wherein the acknowledgement comprises retrieval information useful for retrieving the first content identifier from the distributed electronic ledger system; and
  store the retrieval information in the data storage system for later retrieval.

* * * * *